(12) United States Patent
Seifert et al.

(10) Patent No.: US 10,988,239 B2
(45) Date of Patent: Apr. 27, 2021

(54) SYNCHRONIZATION OF FLUIDIC ACTUATORS

(71) Applicant: Ramot at Tel-Aviv University Ltd., Tel-Aviv (IL)

(72) Inventors: Avraham Seifert, Tel-Aviv (IL); Isaac Dayan, Hod-HaSharon (IL); Tom Shtendel, Hod-HaSharon (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 686 days.

(21) Appl. No.: 15/653,557

(22) Filed: Jul. 19, 2017

(65) Prior Publication Data

US 2017/0313411 A1 Nov. 2, 2017

Related U.S. Application Data

(62) Division of application No. 14/354,579, filed as application No. PCT/IB2012/055887 on Oct. 25, 2012, now Pat. No. 9,718,538.

(Continued)

(51) Int. Cl.
*B64C 21/00* (2006.01)
*F15B 21/12* (2006.01)
(Continued)

(52) U.S. Cl.
CPC ............ *B64C 21/00* (2013.01); *B64C 21/025* (2013.01); *B64C 21/08* (2013.01); *F15B 21/12* (2013.01); *F15C 1/006* (2013.01); *F15C 1/08* (2013.01); *F15C 1/146* (2013.01); *F15C 1/22* (2013.01); *F15D 1/008* (2013.01); *F15D 1/12* (2013.01); *B64C 2230/04* (2013.01); *B64C 2230/06* (2013.01); *B64C 2230/16* (2013.01);
(Continued)

(58) Field of Classification Search
CPC ...................................................... B62D 35/001
USPC ........................................................ 137/826
See application file for complete search history.

(56) References Cited

U.S. PATENT DOCUMENTS 3,219,271 A    11/1965   Bauer
4,930,357 A *  6/1990   Thurston ............... G01F 1/3227
                                                          137/833

(Continued)

FOREIGN PATENT DOCUMENTS

EP    0319594    6/1989
EP    1513711    3/2005

(Continued)

OTHER PUBLICATIONS

Communication Pursuant to Rule 164(1) EPC dated Jul. 20, 2015 From the European Patent Office Re. Application No. 12843978.3.

(Continued)

*Primary Examiner* — Christopher D Hutchens

(57) ABSTRACT

An active separation control system, comprising a fluidic oscillatory actuator having an ejector member, an oscillator member, and a joining channel between said oscillator member and said ejector member, all mounted on at least one flexible member, said fluidic oscillatory actuator being mountable on a rotatable door of a vehicle such that said flexible member assumes a different shape when said door is closed than when said door is open, wherein said joining channel is also flexible to assume a shape of said flexible member.

19 Claims, 30 Drawing Sheets

Related U.S. Application Data

(60) Provisional application No. 61/697,402, filed on Sep. 6, 2012, provisional application No. 61/551,994, filed on Oct. 27, 2011.

(51) Int. Cl.

| | | |
|---|---|---|
| *B64C 21/02* | (2006.01) | |
| *B64C 21/08* | (2006.01) | |
| *F15D 1/12* | (2006.01) | |
| *F15C 1/00* | (2006.01) | |
| *F15C 1/14* | (2006.01) | |
| *F15D 1/00* | (2006.01) | |
| *F15C 1/08* | (2006.01) | |
| *F15C 1/22* | (2006.01) | |

(52) U.S. Cl.
CPC ........... *B64C 2230/18* (2013.01); *Y02T 50/10* (2013.01); *Y10T 137/2071* (2015.04); *Y10T 137/2185* (2015.04)

(56) References Cited

U.S. PATENT DOCUMENTS

| | | | | |
|---|---|---|---|---|
| 5,280,990 | A * | 1/1994 | Rinard | ................. B62D 35/001 296/180.1 |
| 5,524,660 | A | 6/1996 | Dugan | |
| 7,055,541 | B2 * | 6/2006 | Seifert | ..................... F15C 1/10 137/14 |
| 7,128,082 | B1 | 10/2006 | Cerretelli et al. | |
| 7,240,958 | B2 * | 7/2007 | Skopic | ................. B62D 35/001 105/1.3 |
| 8,382,043 | B1 | 2/2013 | Raghu | |
| 2006/0048829 | A1 | 3/2006 | Seifert et al. | |
| 2008/0149205 | A1 | 6/2008 | Gupta et al. | |
| 2009/0146452 | A1 * | 6/2009 | Kjellgren | ............... B62D 35/00 296/180.1 |
| 2010/0104436 | A1 | 4/2010 | Herr et al. | |
| 2010/0193035 | A1 | 8/2010 | Arwatz et al. | |
| 2010/0194142 | A1 | 8/2010 | Seifert et al. | |
| 2011/0148140 | A1 * | 6/2011 | Benton | ................. B62D 35/001 296/180.1 |
| 2013/0076063 | A1 * | 3/2013 | Ryan | ................... B62D 35/001 296/180.1 |
| 2013/0277502 | A1 | 10/2013 | Bauer et al. | |
| 2013/0284294 | A1 | 10/2013 | Golling et al. | |
| 2014/0284430 | A1 | 9/2014 | Seifert et al. | |
| 2017/0036709 | A1 * | 2/2017 | Metka | .................. B62D 35/001 |
| 2019/0248475 | A1 * | 8/2019 | Shmilovich | ............... B64C 9/38 |
| 2019/0283813 | A1 * | 9/2019 | Smith | .................... B62D 37/02 |

FOREIGN PATENT DOCUMENTS

| | | |
|---|---|---|
| EP | 1760262 | 3/2007 |
| EP | 2258607 | 12/2010 |
| WO | WO 2013/061276 | 5/2013 |

OTHER PUBLICATIONS

International Preliminary Report on Patentability dated May 8, 2014 From the International Bureau of WIPO Re. Application No. PCT/IB2012/055887.
International Search Report and the Written Opinion dated Apr. 3, 2013 From the International Searching Authority Re. Application No. PCT/IB2012/055887.
Notice of Allowance dated Mar. 10, 2017 From the US Patent and Trademark Office Re. U.S. Appl. No. 14/354,579. (6 pages).
Official Action dated Sep. 9, 2016 From the US Patent and Trademark Office Re. U.S. Appl. No. 14/354,579.
Official Action dated Feb. 12, 2016 From the US Patent and Trademark Office Re. U.S. Appl. No. 14/354,579.
Supplementary European Search Report and the European Search Opinion dated Nov. 6, 2015 From the European Patent Office Re. Application No. 12843978.3.

\* cited by examiner

SYNCHRONIZATION OF FLUIDIC ACTUATORS

RELATED APPLICATIONS

This application is a division of U.S. patent application Ser. No. 14/354,579 filed on Apr. 27, 2014, which is a National Phase of PCT Patent Application No. PCT/IB2012/055887 having International Filing Date of Oct. 25, 2012, which claims the benefit of priority of U.S. Provisional Patent Application Nos. 61/551,994 filed on Oct. 27, 2011, and 61/697,402 filed on Sep. 6, 2012. The contents of the above application are all incorporated by reference as if fully set forth herein in their entirety.

FIELD AND BACKGROUND OF THE INVENTION

The present invention, in some embodiments thereof, relates to fluid flow and, more particularly, but not exclusively, to a method and system for synchronizing fluidic actuators.

Fluid flow separation can occur when a compressible or incompressible fluid flows over a surface, in particular a convex curved surface, such as an interior surface of a fluid conduit or an exterior surface of a body immersed in a fluid. Flow separation can occur under laminar or turbulent flow conditions, depending upon the boundary layer fluid flow characteristics and the geometry of the surface. It is often desirable to inhibit flow separation in order to reduce form drag or in order to increase aerodynamic lift. In general, the farther along a curved surface that a fluid travels before separation, the lower the resulting form drag and the higher aerodynamic lift.

Flow control technology relates generally to the capability to alter flow properties relative to their natural tendencies by introduction of a constant or periodic excitation. Flow control systems can be categorized into Passive Flow Control (PFC) systems or Active Flow Control (AFC) systems. PFC systems provide substantially constant flow control, whereas AFC systems allow flow control to be selectively applied to a surface in contact with the fluid.

AFC systems are typically utilized to inhibit or delay separation of the fluid flow over the surface. Known AFC systems typically include actuators or actuator arrays for introducing or removing perturbations to the flow and altering the flow characteristics near the surface.

U.S. Pat. No. 7,055,541 discloses a suction and periodic excitation flow control mechanism. The mechanism includes: a jet of fluid at a controlled input pressure which is directed by control pressure gradient between two opposite ports at the sides of the jet. The mechanism also comprises a suction slot for allowing additional fluid to join the flow and create an amplified flow. An oscillating deflection device directs the amplified flow in two or more exit directions.

U.S. Published Application No. 20100193035 discloses an automatic mechanism to produce a fluid jet with an oscillating exit direction. The mechanism includes a conduit which conveys a flow of fluid, a feedback control tube terminating in two control ports connected to one another by the feedback tube, and means for varying the effective diameter of the feedback control tube.

U.S. Published Application No. 20100194142 discloses a technique for reducing aerodynamic drag on a body moving through a fluid. A flow generator is mounted adjacent a blunt rear edge of the body. The flow generator generates a flow which controls an external flow at an edge of the body, wherein the flow of air oscillates in a direction parallel to the blunt edge.

SUMMARY OF THE INVENTION

According to an aspect of some embodiments of the present invention there is provided a fluidic system. The system comprises: a plurality of fluidic oscillatory actuators, and at least one synchronization conduit connecting two or more of the actuators such as to effect synchronization between oscillations in the two or more connected actuators.

According to some embodiments of the invention the synchronization conduits are effective to provide the synchronization devoid of any moving non-fluidic parts.

According to some embodiments of the invention at least one of the actuator is a suction and oscillatory blowing actuator (SaOB).

According to some embodiments of the invention the synchronization conduits are selected to control phase lag among the actuators.

According to some embodiments of the invention the system comprises at least one feedback conduit.

According to some embodiments of the invention the synchronization conduit(s) is constituted to effect opposite oscillations among at least one pair of oscillatory actuators.

According to some embodiments of the invention a frequency of the oscillatory actuators is X times an expected vortex shedding frequency of fluid at the vicinity of the system, wherein X is from about 1.5 to about 3.5. According to some embodiments of the invention the X equals 2.

According to some embodiments of the invention a distance between adjacent fluidic oscillatory actuators is about X v St/f, wherein v is an expected velocity of fluid at the vicinity of the system, f is an expected vortex shedding frequency of fluid at the vicinity of the system, St is an expected Strouhal number characterizing fluidic oscillations, and X is from about 0.5 to about 4.

According to some embodiments of the invention each oscillatory actuator comprises two opposing control ports, wherein each control port of each oscillatory actuator is respectively connected to at least two control ports of at least two another oscillatory actuators.

According to some embodiments of the invention each oscillatory actuator comprises two opposing control ports, wherein each control port of each oscillatory actuator is connected to only one control port of another oscillatory actuator.

According to an aspect of some embodiments of the present invention there is provided an active separation control system, attachable to the rear end of a vehicle and comprising the system as delineated hereinabove and/or optionally as further detailed hereinbelow.

According to some embodiments of the invention the system comprises a flexible member, wherein the fluidic oscillatory actuators and the synchronization conduit(s) are mounted on the a flexible member, and wherein the system is mountable on a rotatable door of the vehicle such that the flexible member assumes a different shape when the door is closed than when the door is open.

According to some embodiments of the invention the vehicle is a truck trailer.

According to some embodiments of the invention the vehicle is an aeronautical vehicle.

According to an aspect of some embodiments of the present invention there is provided a vehicle, comprising the system as delineated hereinabove and/or optionally as further detailed hereinbelow.

According to an aspect of some embodiments of the present invention there is provided an active separation control system, attachable to an object selected from the group consisting of an airfoil, a wing or a fuselage, and comprising the system as delineated hereinabove and/or optionally as further detailed hereinbelow.

According to an aspect of some embodiments of the present invention there is provided an active separation control system. The system comprises a fluidic oscillatory actuator having an ejector member and an oscillator member both mounted on a flexible member. The fluidic oscillatory actuator is mountable on a rotatable door of a vehicle such that the flexible member assumes a different shape when the door is closed than when the door is open.

According to an aspect of some embodiments of the present invention there is provided a method of synchronizing fluidic oscillatory actuators. The method comprises establishing fluid flow within at least one synchronization conduit connecting at least two actuators such as to effect synchronization between oscillations in the at least two actuators.

According to some embodiments of the invention the method wherein each actuator is connected by a respective synchronization conduit to all other actuators in the array.

According to some embodiments of the invention the method comprises controlling a phase lag among the actuators.

According to some embodiments of the invention the method comprises establishing a feedback flow between opposite ports of the same actuator.

According to some embodiments of the invention the method comprises generating opposite oscillations among at least one pair of oscillatory actuators.

According to some embodiments of the invention each oscillatory actuator comprises a set of suction openings, and the method comprises closing at least one of the suction openings so as to effect the magnitude of a spatial wave generated in the actuators.

According to some embodiments of the invention each oscillatory actuator comprises a plurality of pulsed blowing slots, wherein the closing of the at least one of the suction openings is so as to effect a location of magnitude of the spatial wave relative to the pulsed blowing slots.

According to some embodiments of the invention the method is executed for actively controlling the flow at a fluid boundary layer.

According to some embodiments of the invention the method is executed for actively controlling the flow over a bluff body.

According to some embodiments of the invention the method is executed for actively controlling wake flow.

According to some embodiments of the invention the method is executed for actively controlling lift.

According to some embodiments of the invention the method is executed for actively controlling moment acting on a fuselage, a rocket or an aircraft.

According to some embodiments of the invention the method is executed for actively reducing drag.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
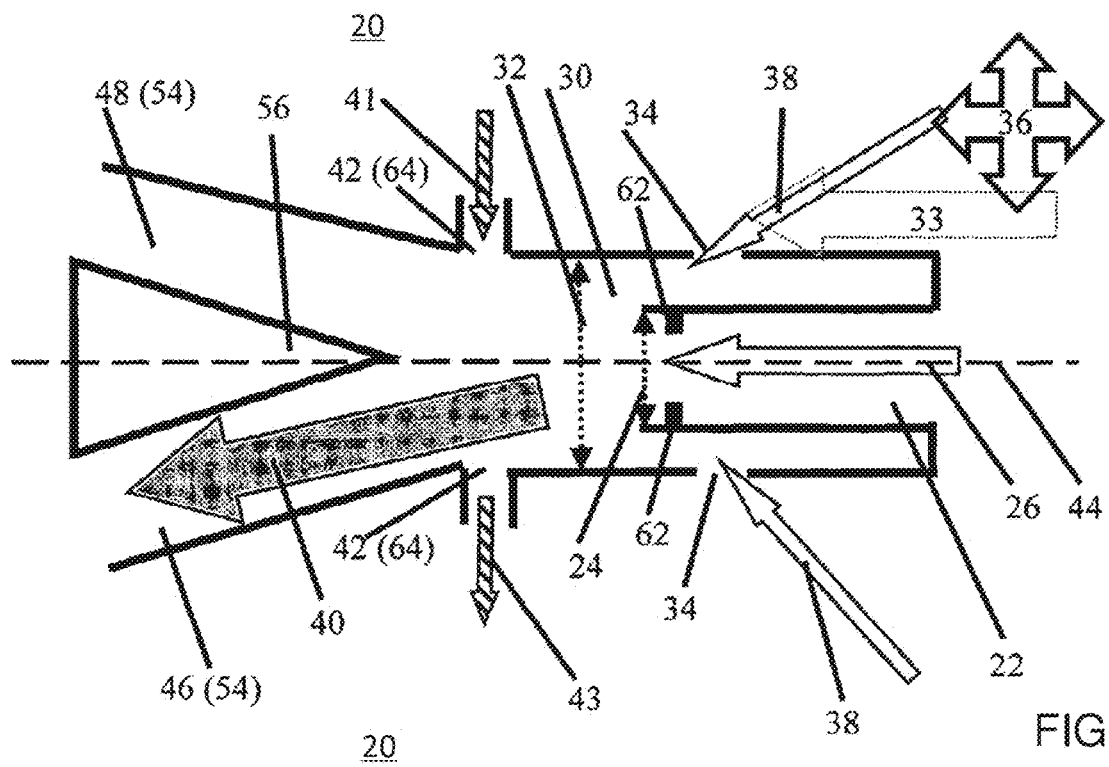
FIGS. 1A-1F are schematic illustrations of an oscillatory blowing actuator, according to some embodiments of the present invention.

The present invention, in some embodiments thereof, relates to fluid flow and, more particularly, but not exclusively, to a method and system for synchronizing fluidic actuators.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Some embodiments of the present invention comprise a method and apparatus suitable for synchronizing an array of unsteady fluidic actuators, such as, but not limited to, fluidic oscillatory actuators which rely on pressure oscillations to achieve self- or forced oscillatory motion. The synchronization of the fluidic oscillators is optionally and preferably for the purpose of obtaining a generally uniform (e.g., within 20% or within 10% or within 5% or within 1%) oscillator frequency along the array. Optionally, the synchronization provides also generally uniform (e.g., within 20% or within 10% or within 5% or within 1%) oscillation amplitude along the array. In some embodiments, the synchronization provides also generally uniform phase (e.g., within 0.4 radians or within 0.35 radians or within 0.3 radians or within 0.2 radians or within 0.1 radians) along the array.

The synchronization of the fluidic oscillators array according to some embodiments of the present invention is achieved by synchronizing the pressure oscillations which drive the forced oscillations. In various exemplary embodiments of the invention a physical connection is established between two relevant points in each valve pair so as to synchronize their oscillations. Optionally and preferably, such connection is established for each valve in the array. In some embodiments of the present invention the physical connection comprises a synchronization tube. The resistance of the tube is preferably sufficiently small such as to ensure synchronization between the valves. Sufficiently small resistance can be achieved by selecting a tube with a sufficiently large cross-section. Optionally and preferably an increasing phase lag is implemented with judicious selection of the parameters of the synchronization tube(s).

In some embodiments of the present invention the two points are connected via a pair of connectors. When the array is large, two synchronization conduits with multiple ports can be employed. Each such synchronization conduit can be connected to the appropriate location in each valve of the synchronized pair, to form a synchronized oscillation.

In some embodiments of the present invention at least a few of (e.g., all) the actuators are Suction and Oscillatory Blowing (SaOB) Actuators. Oscillatory-blowing is an effective tool to delay boundary layer separation. The SaOB actuator employs steady suction and periodic blowing through openings in the surface (e.g., narrow spanwise or streamwise slot or array of holes) to enhance shear-layer mixing and transfer fluid from outside the shear-layer to the wall region, thus preventing or reducing boundary layer separation.

SaOB actuators are known, and found, for example, in U.S. Pat. No. 7,055,541. A representative example of an SaOB 20 suitable for the present embodiments is illustrated in FIGS. 1A-1F.

SaOB actuator 20 comprises an ejector member 22 characterized by a first diameter 24(d1). The ejector member 22 is capable of directing a jet 26 (wide white arrow) of fluid at a controlled input pressure. The fluid may be, for example, air (gas) or water (liquid) or two or three phase flow of gas, liquid and solid particles. SaOB 20 further comprises a joining channel 30 characterized by a second diameter 32 (d2). In various exemplary embodiments of the invention d2 is greater than d1. The joining channel 30 is in fluid communication and is capable of receiving flow 26 from the ejector member 22.

SaOB actuator 20 comprises one or more suction slot 34 in fluid communication with the joining channel 30 and an environment 36 external to the SaOB actuator. Suction slot(s) 34 are configured for allowing additional fluid 38 to join the jet 26 to create an amplified flow 40.

The term "slot" as used in suction slot 34 is to be construed in its widest possible sense for purposes of this specification and the accompanying claims. Slot, as used herein, refers to any open, or openable, channel of fluid communication. Thus, suction slots may be either permanent openings or openable apertures of any cross sectional shape.

Figure 1B:
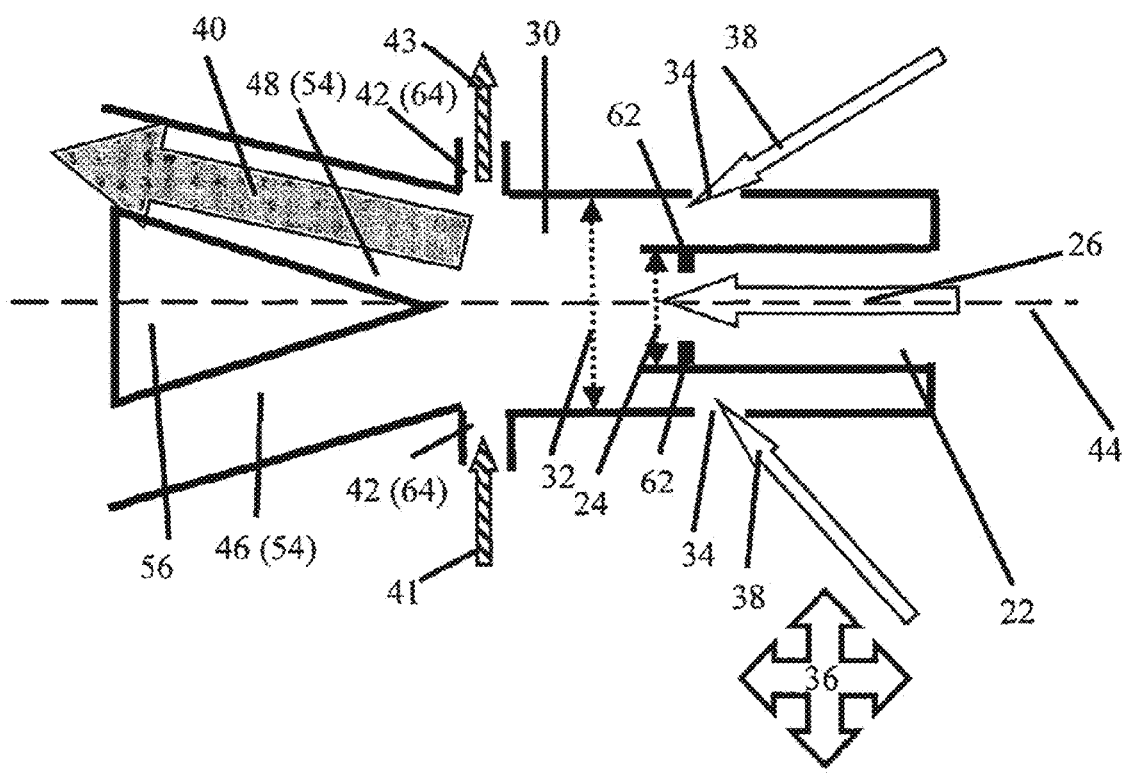
Figure 1C:
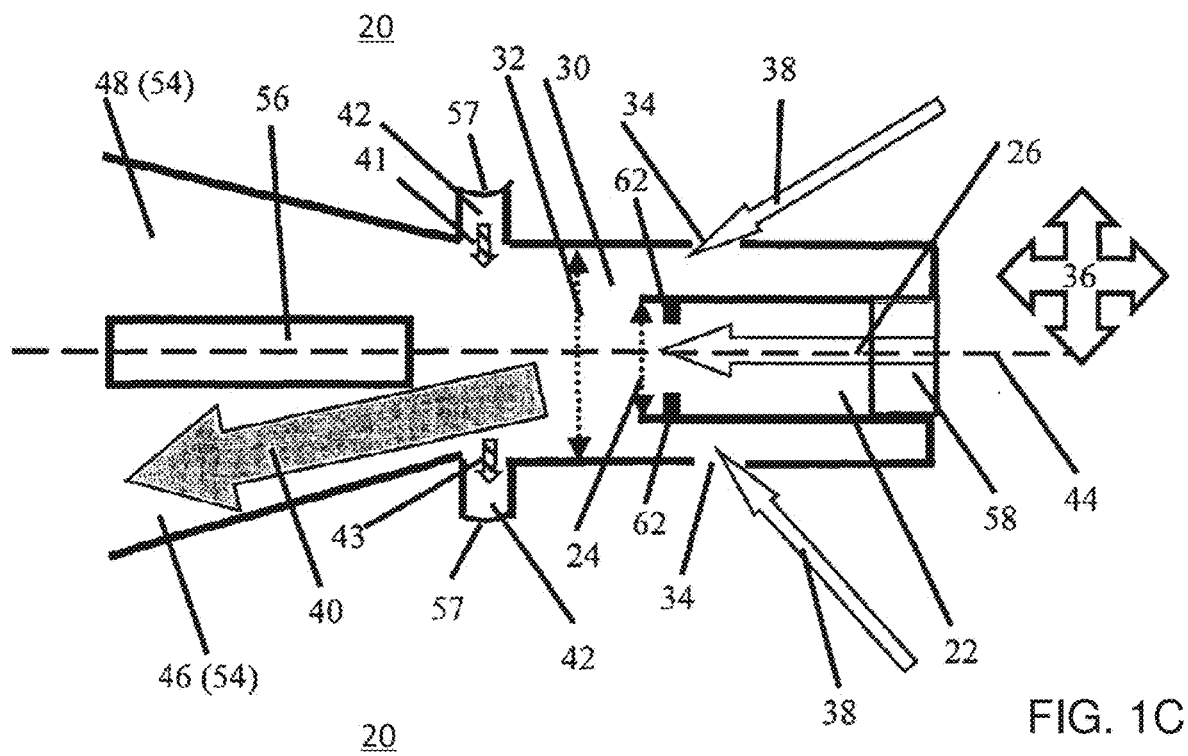
Figure 1D:
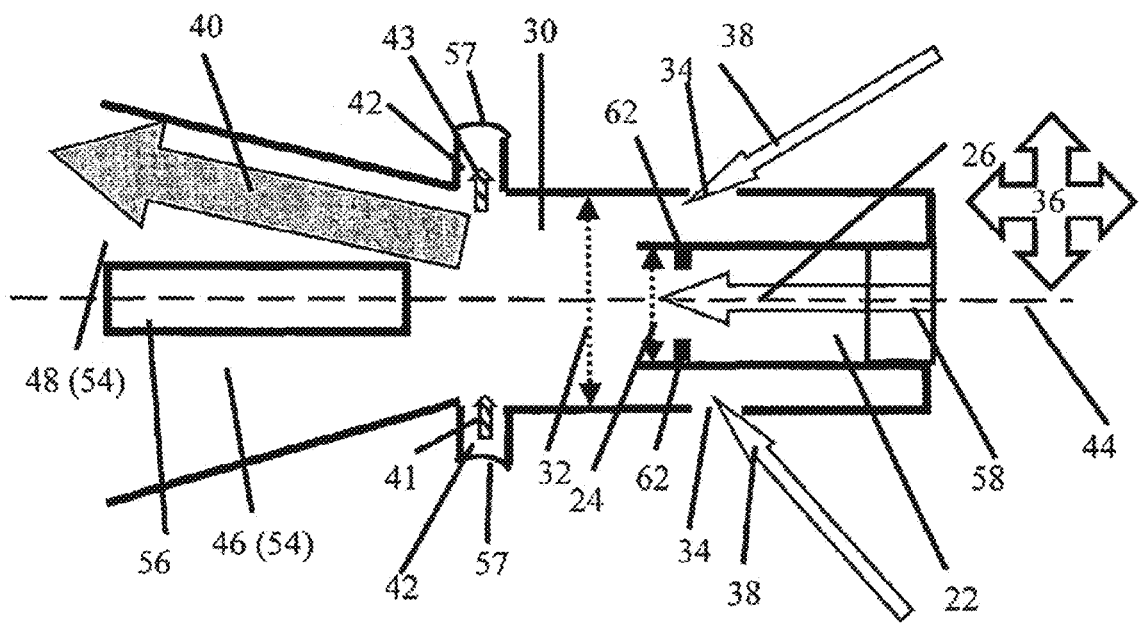
Figure 1E:
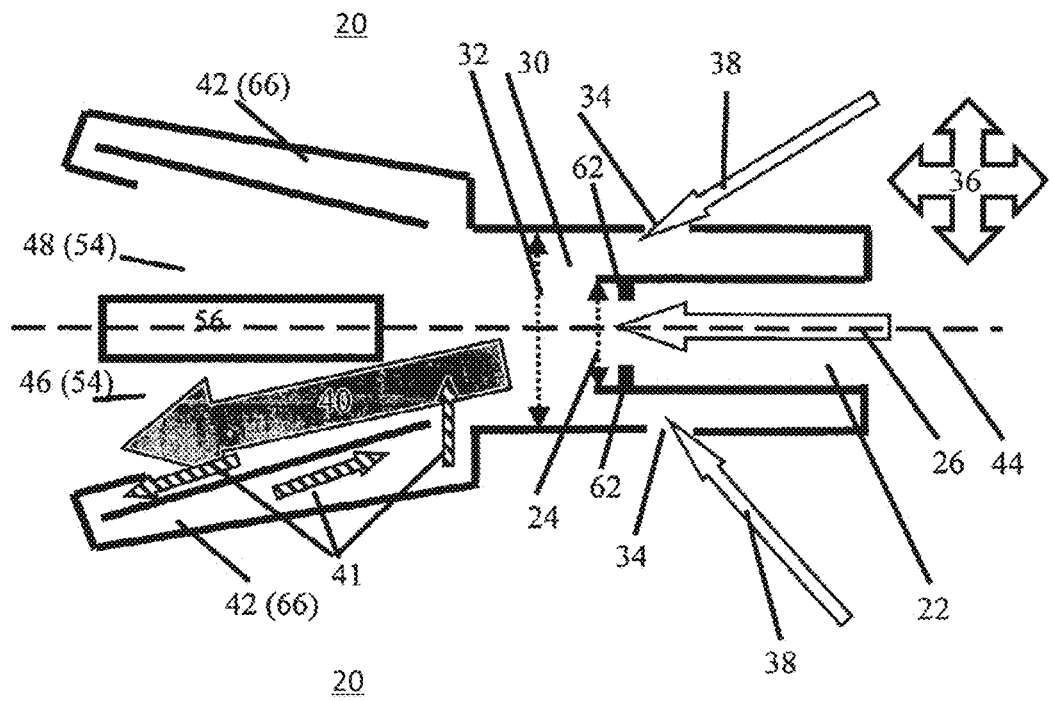

SaOB actuator 20 can further comprise a deflection device or a set of control ports 42 configured for applying a transverse pressure differential (41 and/or 43; cross hatched arrows) to a longitudinal axis 44 of the jet 26 to direct amplified flow 40 in a first desired exit direction 46 (FIGS. 1A, 1C and 1E). Deflection device or set of control ports 42 is also configured for redirecting the amplified flow in at least one additional desired exit direction 48 (FIGS. 1B, 1D and 1F) by modifying a circumferential angle by which pressure differential (41 and/or 43) is transverse to longitudinal axis 44.

In FIGS. 1A-1F, a total of two exit directions 46 and 48 are illustrated because the circumferential angle by which pressure differential (41 and/or 43) is transverse to longitudinal axis 44 has been modified by 180 degrees. It will be appreciated that any total number of exit directions 46 and 48 may be achieved by modifying the circumferential angle by which pressure differential (41 and/or 43) is transverse to longitudinal axis 44 by a circumferential angle defined by 360 degrees/n where n is the total number of exit directions 46 and 48 desired. Thus, if n=3, the circumferential angle is 120 degrees, two additional exit directions 48 are defined and a total of three exit directions 46 and 48 are employed. If n=4, the circumferential angle is 90 degrees, three additional exit directions 48 are defined and a total of four exit directions 46 and 48 are employed and so on and forth.

In the pictured embodiments first desired exit direction 46 and additional exit direction 48 are each defined by an exit port 54. Again, while two exit ports 54 are pictured, the scope of the invention includes mechanisms with as many as n exit ports where n is the total number of exit directions 46 and 48 desired as described hereinabove. Exit ports 54 may be defined, for example, by introduction of splitter 56 into conduit 30. Splitter 56 is optionally and preferably triangular (FIGS. 1A and 1B).

It will be appreciated that the total transverse pressure differential is the vector sum of positive differential 41 directed towards axis 44 and negative differential 43 directed away from axis 44. Thus, various embodiments of the invention may employ deflection devices or control ports 42 that apply only positive differential(s) 41, that apply only negative differential(s) 43 or that apply both positive differential(s) 41 and negative differential(s) 43.

Similarly, some preferred embodiments of the invention rely upon alternately applying only positive differential 41 and applying only negative differential 43 on the same side of axis 44.

Deflection device 42 may, for example, include at least one control port having a fluidic valve 64 (FIGS. 1A and 1B) capable of supplying at least a portion of (e.g., 41 and/or 43) pressure differential transverse to longitudinal axis 44 of flow 26 with a predetermined periodicity. According to this embodiment transverse pressure differential 41 and 43 is initially employed to direct amplified flow 40 in first exit direction 46. In response to a command from a controller (not shown), the circumferential angle of transverse pressure differential 41 and 43 is rotated by 180 degrees and amplified flow 40 is directed to additional exit direction 48 (FIG. 1B). This process can be iteratively repeated in response to commands from the controller. The end result is that amplified flow 40 oscillates between exit directions 46 and 48 at a frequency determined by the controller.

Oscillation of flow 40 can also be achieved without the use of a controller. For example, it was found by the present inventors that oscillations can be generated by establishing a feedback loop between the control ports 42. In these embodiments, the oscillation is optionally and preferably generated without any moving part or energy expenditure. Such oscillation is referred to herein as self-oscillation.

In some embodiments of the present invention deflection device 42 comprise at least two opposing zero-mass-flux devices (FIGS. 1C and 1D) operating at a predetermined periodicity. Each of the zero mass flux devices 58 is capable of supplying at least a portion (41 and/or 43) of the pressure differential transverse to longitudinal axis 44 of the jet 26. Oscillation between exit directions 46 and 48 is achieved by causing zero mass flux devices 58 to operate out of phase so that at a first time point (FIG. 1C) one diaphragm 57 flexes into zero-mass-flux device 58 to create a positive pressure differential 41 while the diaphragm 57 of the second flexes out of zero-mass-flux device 58 to create a negative pressure differential 43. Amplified flow 40 is thus directed towards first exit direction 46 defined by exit port 54. At a subsequent time point, one half period of the oscillation frequency of zero mass flux devices 58, the situation is reversed (FIG. 1D) and amplified flow 40 is directed towards second exit direction 48 defined by exit port 54. According to additional embodiments of the invention, more than two zero mass flux devices 58 are employed to define more than two exit directions 46 and 48. Regardless of the total number of zero mass flux devices 58 employed, the total transverse pressure differential is the vector sum of all partial pressure differentials 41 and 43.

Figure 1F:
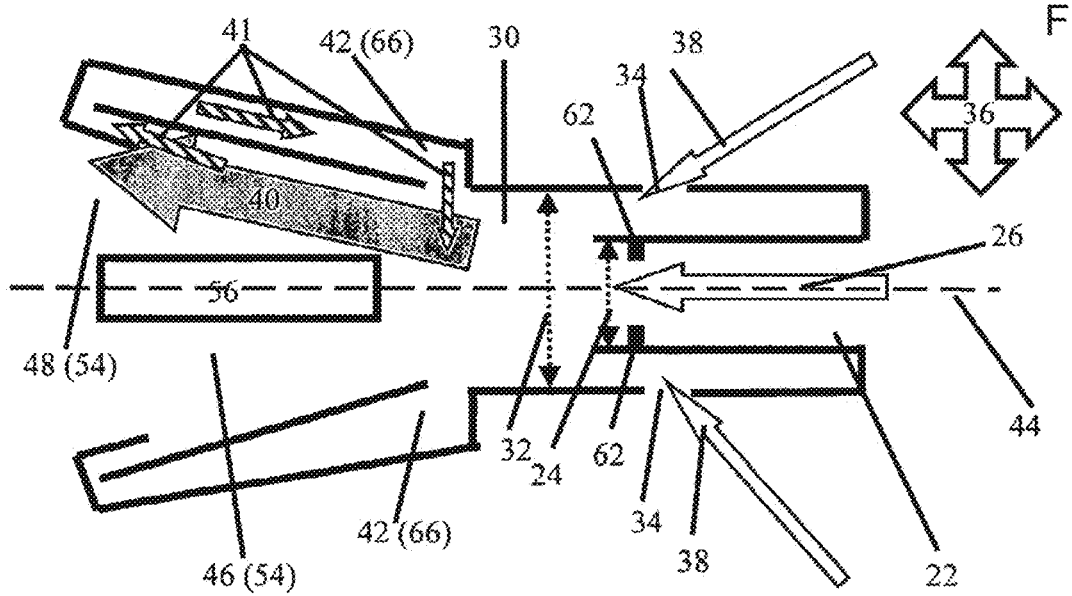

Alternately, or additionally, deflection device 42 may, for example, include at least two resonance tubes 66 (FIGS. 1E and 1F). Each of resonance tubes 66 is independently capable of capturing a portion 41 of amplified flow 40 as it flows in one of desired exit directions 46 or 48 and applying captured portion 41 of amplified flow transverse 41 to longitudinal axis 44 of flow 26 to create pressure differential 41. This causes amplified flow 40 to alter its exit direction.

The controller, if employed, may be mechanical, electronic or a combination thereof. Preferably, the controller includes a computerized data processing device and suitable hardware interfaces operable by the controller with at least a certain level of autonomy once the commands are determined. Alternately, or additionally, the controller may require manual input of commands.

Preferably, suction slot(s) 34 is deployed on a surface in contact with a boundary layer of an external fluid flow 33 (FIG. 1A) so that the additional fluid 38 joins the jet 26 via at least one suction opening 34 includes at least a portion of external fluid flow 33. External, as used with respect to flow 33, indicates external to the SaOB actuator 20.

Optionally, but preferably, at least a portion of flow 26 emanating from the ejector member 22 is supplied by at least one oscillatory zero-mass-flux device 58 (FIGS. 1C and 1D). U.S. Pat. No. 6,751,530, the contents of which are hereby incorporated by reference, provides details of the principles of operation of oscillatory zero-mass-flux jets.

Optionally and preferably, flow 26 is mixed in proximity to a junction between the ejector member 22 and the joining channel 30. Mixing may be accomplished by means of a mixer, which may rely, at least in part, upon at least one protrusion 62 from an inner surface of ejector member 22. Protrusion(s) 62 create a disturbance in the jet 26 as flow 26 passes thereupon and mixing results. Alternately, or additionally, the mixer may include an active oscillatable (mechanical or fluidic) device, capable of introducing sufficient unsteadiness to the flow such that mixing is enhanced.

Figure 2:
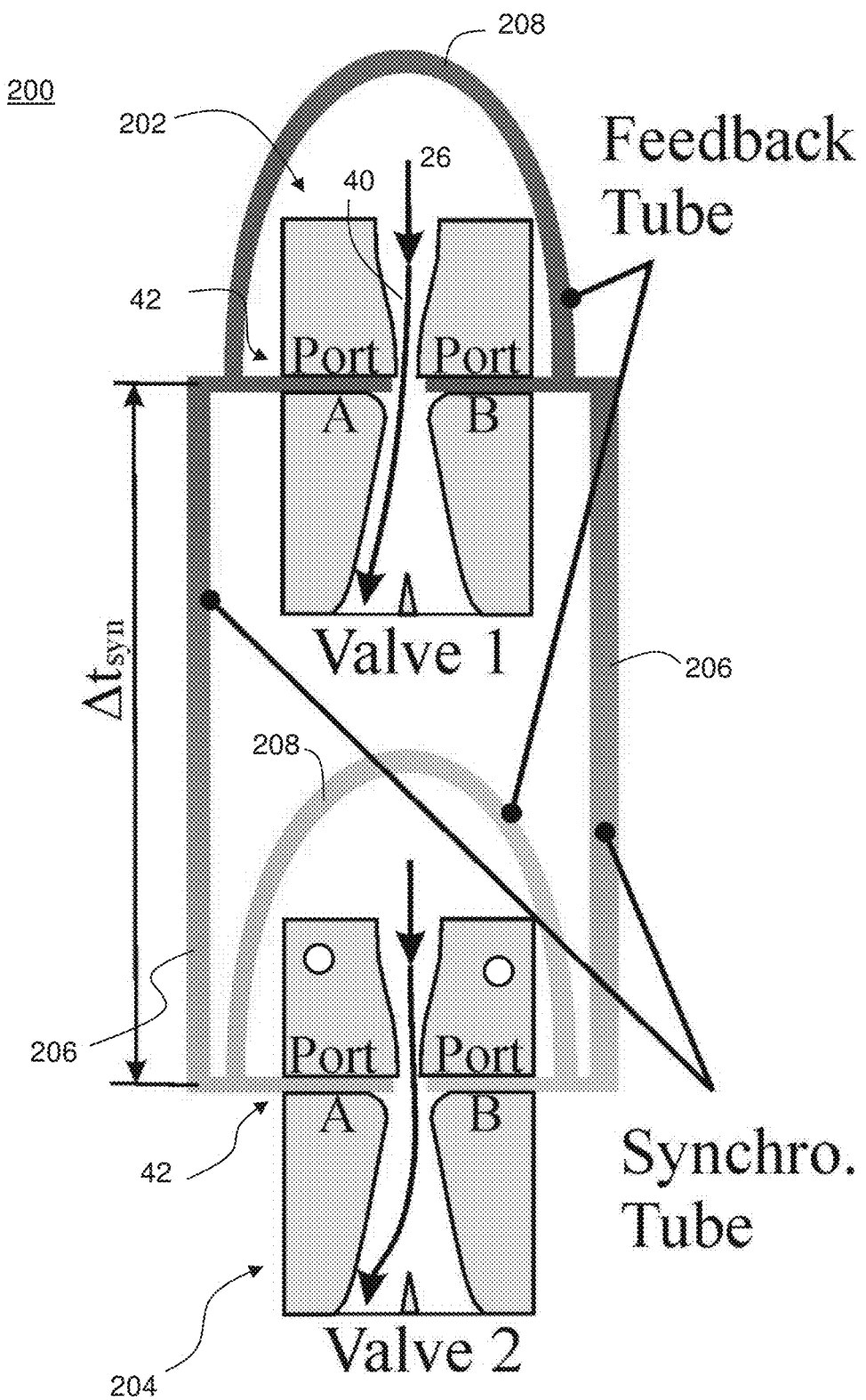
FIG. 2 is a schematic illustration of a fluidic system, according to some embodiments of the present invention.

FIG. 2 is a schematic illustration of a fluidic system 200, according to some embodiments of the present invention. System 200 comprises a plurality of fluidic oscillatory actuators. Two actuators, 202 and 204, are shown in FIG. 2 but any number of actuators can be employed. Actuators 202 and 204 are preferably unsteady fluidic actuators. Any type of unsteady fluidic actuator is contemplated, including, without limitation, mechanical piezoelectric actuator, piezoelectric fluidic actuator, pulsed combustion jet actuator, Hartmann tube, plasma actuator, and SaOB actuator.

At least one of the actuators has an ejector member and an oscillator member. The ejector member receives a flow 26 of fluid at a controlled input pressure and provides an amplified flow 40 (for example, by means of additional fluid, not shown in FIG. 2, entrained flow via one or more suction slot(s), as further detailed hereinabove). The oscillator member receives the amplified flow 40 and generates the fluidic oscillations (for example, by means of a deflection device or controlled ports 42 as further detailed hereinabove). For clarity of presentation, only the oscillator members are illustrated in FIG. 2. Ejector members suitable to some embodiments of the present invention are illustrated in FIGS. 1A-1F and 8A-8C.

System, 200 comprises one or more synchronization conduit 206 connecting at least two of the actuators such as to effect synchronization between the oscillations in the respective actuators. For example, when the actuators are SaOB actuators, conduit 206 can be connected between the respective deflection devices 42 of the actuators.

In the representative illustration of FIG. 2, which is not to be considered as limiting, synchronization conduits are connected at both the deflection devices (designated control port A and control port B) of each connector such that control ports of the same side are connected (port A to port A and port B to port B). Also contemplated are embodiments in which control ports of opposite sides are connected by the synchronization conduit (port A to port B). Such configuration can be used for generating opposite oscillations (about 180 degrees out-of-phase) between a pair of actuators. The pressures differences along synchronization conduits 206 are shown in FIG. 2 using color codes, where blue corresponds to low pressures and red corresponds to high pressures.

In various exemplary embodiments of the invention system 200 comprises one or more self-feedback conduits 208. Each self-feedback conduit 208 is constituted to establish oscillatory pressure gradient between the two control ports of the same actuator.

In some embodiments of the present invention each control port of each oscillatory actuator is respectively connected to at least two control ports of at least two another oscillatory actuators. In alternative embodiments, each control port of each oscillatory actuator is connected to only one control port of another oscillatory actuator. Other configurations or combination of configurations are not excluded from the scope of the present invention.

Figure 3:
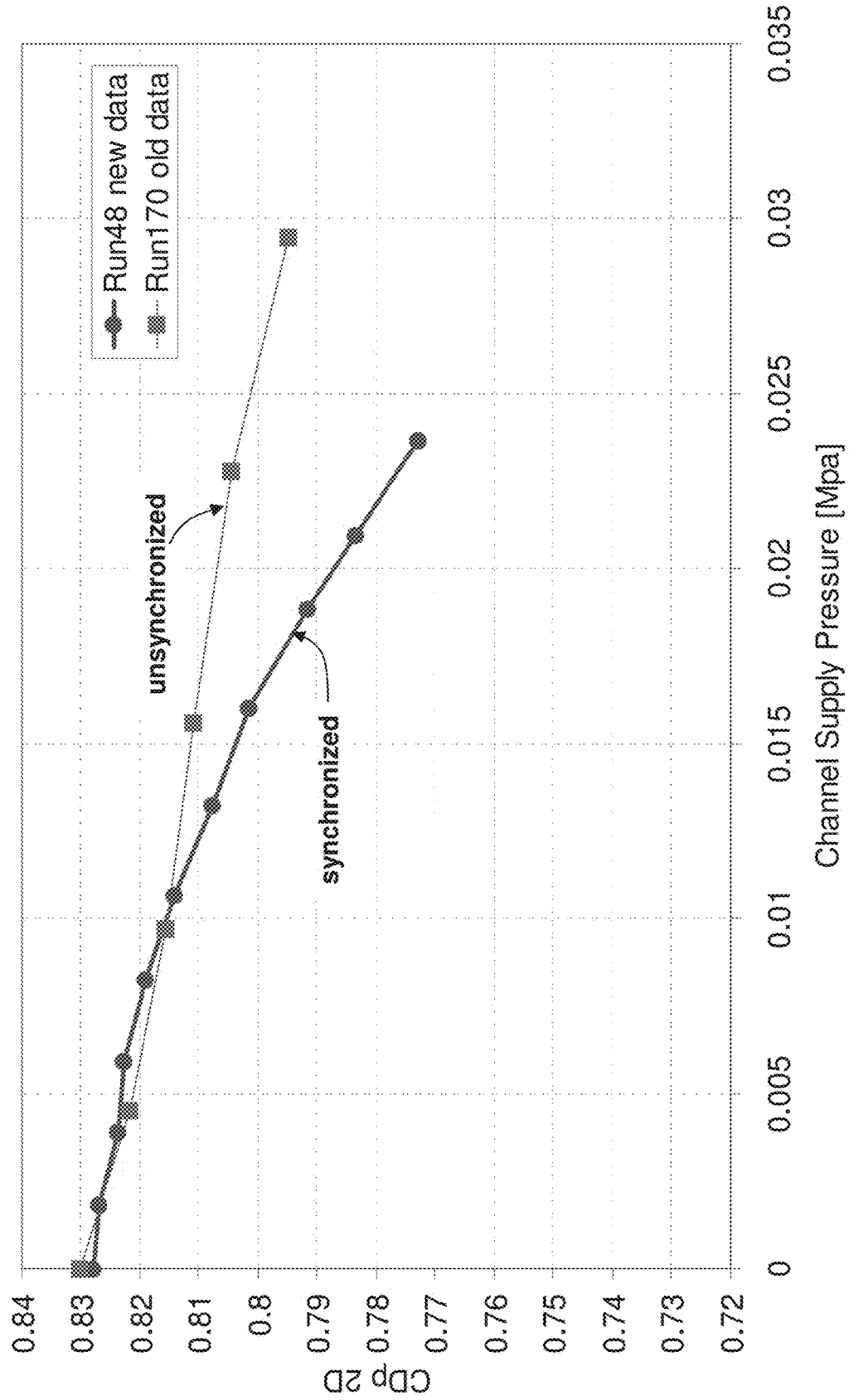
FIG. 3 shows form drag coefficient as a function of an inlet pressure of an the actuators as measured during experiment performed according to some embodiments of the present invention.

It is recognized by the present inventors that synchronization between the actuators reduces the drag. In an experiment performed by the present inventors a 1:12 scaled truck model was placed in a wind tunnel. FIG. 3 shows the form drag coefficient as a function of the actuators' inlet pressure as measured during the experiment. The red round symbols correspond to synchronized mode of operation and the magenta square symbols correspond to an unsynchronized mode of operation. As shown, there is larger drag reduction in the synchronized mode of operation than in the unsynchronized mode of operation. For example, at an inlet channel supply pressure of 0.023 MPa, the technique of the present embodiments doubles the drag reduction. Further details regarding the experiment are provided in the Examples section that follows.

Figure 4:
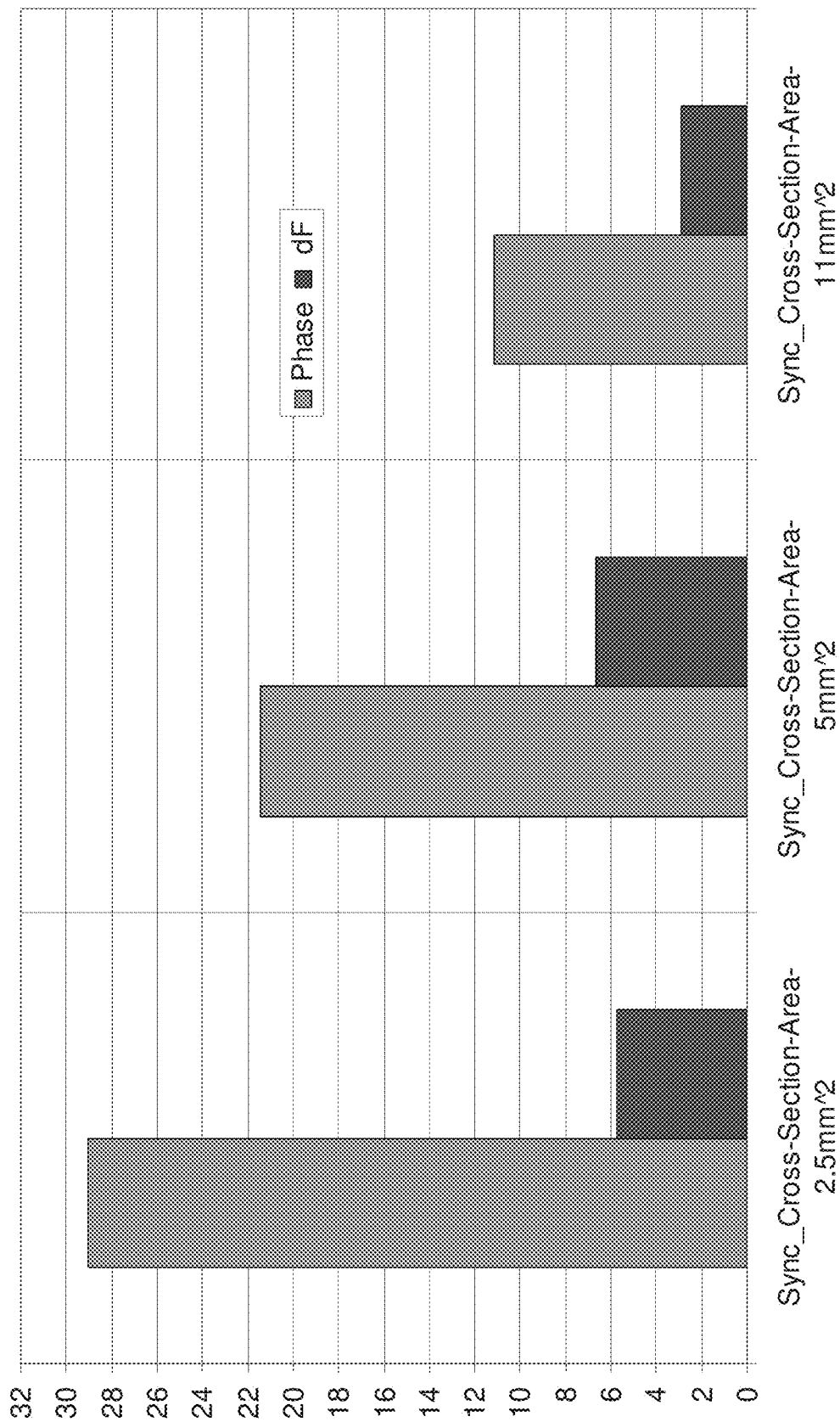
FIG. 4 shows results of increasing the phase lag between two valves by reducing the cross section of the synchronization tube as obtained during experiment performed according to some embodiments of the present invention.

Optionally, a controlled phase lag is generated. This can be done by increasing the resistance of or decreasing the cross section of the synchronization tubes/ducts. FIG. 4 shows results of increasing the phase lag between two valves by reducing the cross section of the synchronization tube. Shown in FIG. 4 are the relative phase (blue) and frequency variation (red) for 3 different synchronization channel cross-section areas.

The system of present embodiments can be used in many applications. In some embodiments the system is used for actively controlling the flow at boundary fluid layers, in some embodiments the system is used for actively controlling the flow over a bluff body, in some embodiments the system is used for actively controlling wake flow, in some embodiments the system is used for actively controlling lift (e.g., of an aerial vehicle), in some embodiments the system is used for actively controlling moment (e.g., of a rocket or aircraft), and in some embodiments the system is used for actively reducing drag. The system of the present embodiments is particularly useful for controlling one or more of the above quantities at the surface of a vehicle, such as, but not limited to, a truck aft-body, a shipping container on a truck bed, a semi-trailer, a trailer or an aeronautical vehicle such as a rocket or an aircraft helicopters, external stores or the like. The system of the present embodiments is also useful for controlling one or more of the above quantities at various types of airfoils, including, without limitation, a wing of an aeronautical or ground vehicle or a blade of a wind turbine.

The present embodiments can be implemented as an active separation control system, such as an AFC system for alter flow behavior using small, unsteady, localized energy injection or fluid removal. In some embodiments of the present invention system 200 is used for reducing aerodynamic drag. Aerodynamic drag is the cause for more than two-thirds of the fuel consumption of large trucks at highway speeds (e.g., U.S. permitted highway speeds). Due to functionality considerations, the aerodynamic efficiency of the aft regions of large trucks was traditionally sacrificed. This leads to massively separated flow at the lee side of truck trailers, with an associated drag penalty: roughly a third of the total aerodynamic drag. In various exemplary embodiments of the invention an AFC system, which may be or comprise system 200, is attached to the back side of a vehicle, such as, but not limited to, a truck trailer or an aeronautical vehicle. The AFC system of the present embodiments redirects the flow separating from the vehicle to turn into the lee side of the vehicle thereby increasing the base pressure (static pressure on the lee-side) and significantly reducing drag.

Figure 5:
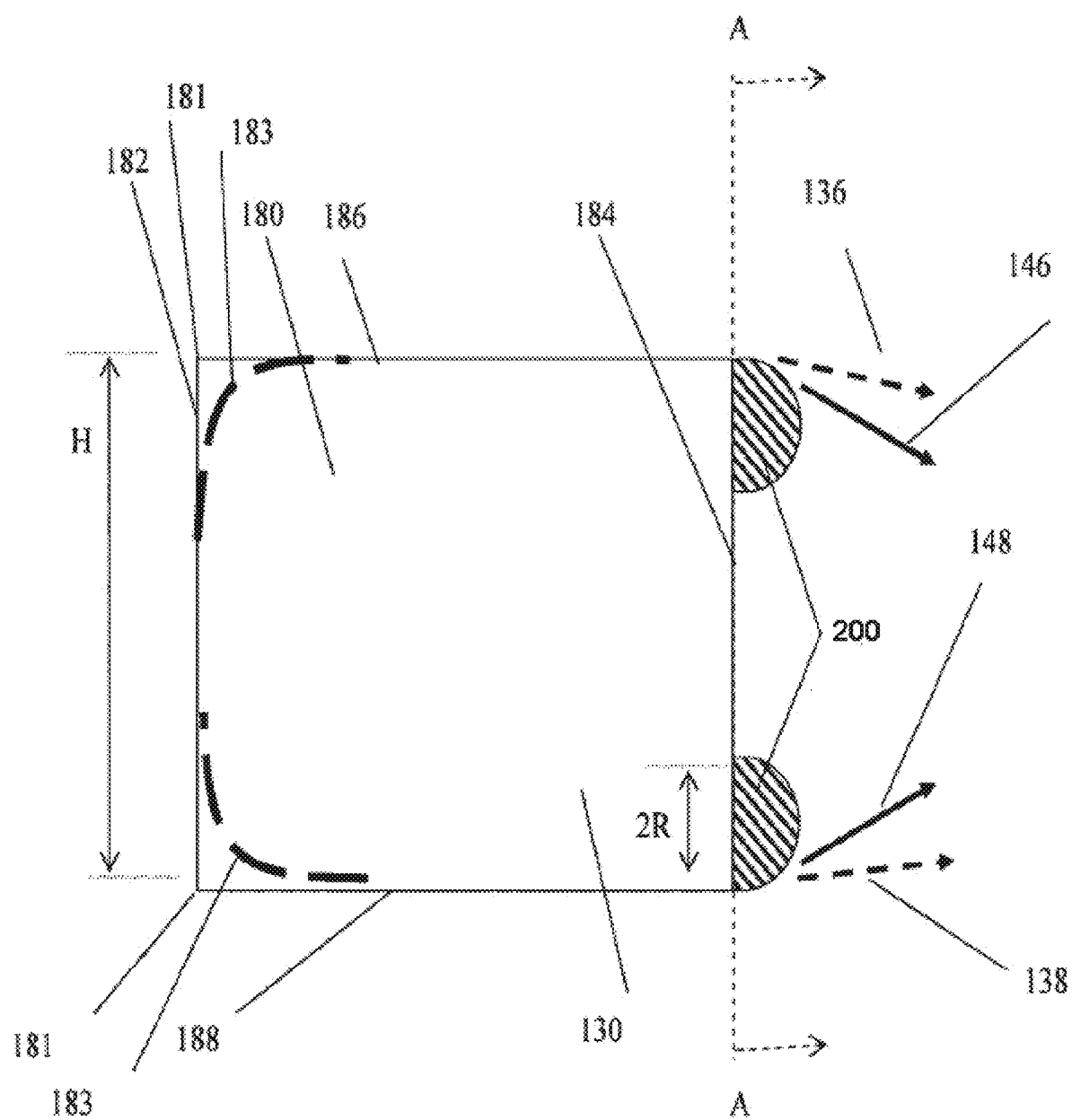
FIG. 5 is a schematic representation in a lateral cross sectional view of a system according to an exemplary embodiment of the invention installed on a blunt-body.

FIG. 5 is a schematic representation in a lateral cross sectional view of system 200 according to an exemplary embodiment of the invention installed on a blunt-body 180. In an exemplary embodiment of the invention, blunt body 180 is a truck aft-body or a shipping container on a truck bed, semi-trailer or trailer. In the depicted embodiment, system 200 is installed on upper and lower parts of trailing face 184. Alternatively, or additionally, system 200 can be installed on lateral (vertical) edges of trailing face 184.

Air flows around blunt body 180 as it travels forward (left in this view) with leading face 182 (seen as an edge in this view) disrupting the airflow so that an external flow is created above upper surface 186 of blunt body 180, along the sides of body 180, and below lower surface 188 of blunt body 180. Typically, but not necessarily, all external flows separate and continue to flow parallel beyond trailing face 184 of blunt body 180 at the height of upper surface 186 and lower surface 188, respectively and from the sides of body 180.

In the exemplary embodiment of FIG. 5, which is not to be considered as limiting, system 200 comprises two actuator chambers, each optionally and preferably comprises an array of synchronized actuators. However, this need not necessarily be the case, since, for some applications, it may not be necessary for the system to include two chambers. For example, a single chamber or more than two chambers can be employed. Each chamber is depicted as having a 180 degree circular arc in cross section. Optionally, arc angles of 90 degrees or less are sufficient in terms of flow control functionality and are used to merely attach system 200 to trailing face 184.

Physical presence of the actuator at the upper part of face 184 according to an embodiment of the invention causes passive redirection of external flow layer airflow in a downward direction as indicated by 136. An actuator mounted adjacent to lower edge 188 according to some embodiments of the present invention causes a similar passive redirection of external airflow in an upward direction as indicated by 138. This effect can be attributed to the function of system 200 as a passive deflector. The same principle holds when system 200 is mounted on to the sides of the blunt surface 184.

It is recognized by the present inventors that when an active separation control system is provided as an add-on system to an existing vehicle, particularly a vehicle having a rear door, it can cause a conflict with the ability of the rear door to open beyond 180 degrees. To allow opening the rear door beyond 180 degrees, the active separation control system can be mounted on the door in a detachable manner, so that the system is dismounted before opening the door and remounted once the door is closed.

Alternatively, an active separation control system according to some embodiments of the present invention can be constructed to allow opening the rear door beyond 180 degrees without dismounting the system from the rear door. This can be done by providing a system, which comprises a fluidic oscillatory actuator having an ejector member and an oscillator member both mounted on one or more flexible member. The fluidic oscillatory actuator is mountable on a rotatable door of a vehicle such that the flexible member is more curved when the door is closed than when the door is open.

Figure 6A:
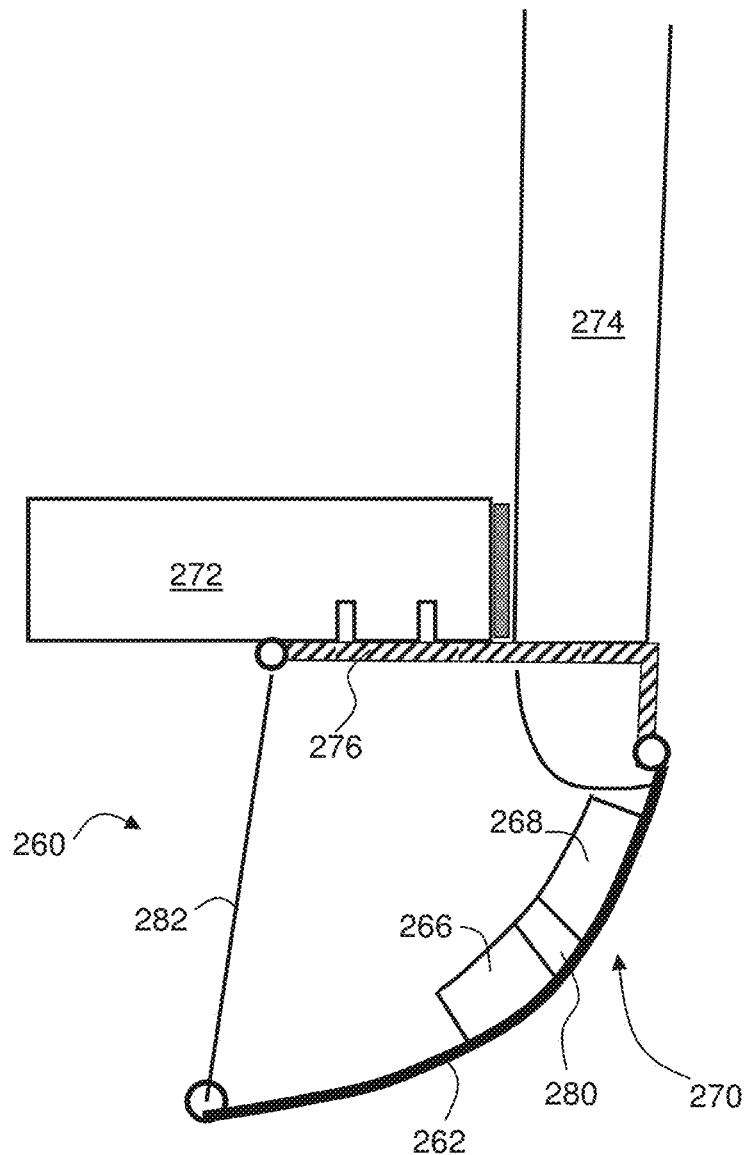
FIGS. 6A and 6B are schematic illustrations showing a representative example of an active separation control system having a flexible member.
Figure 6B:
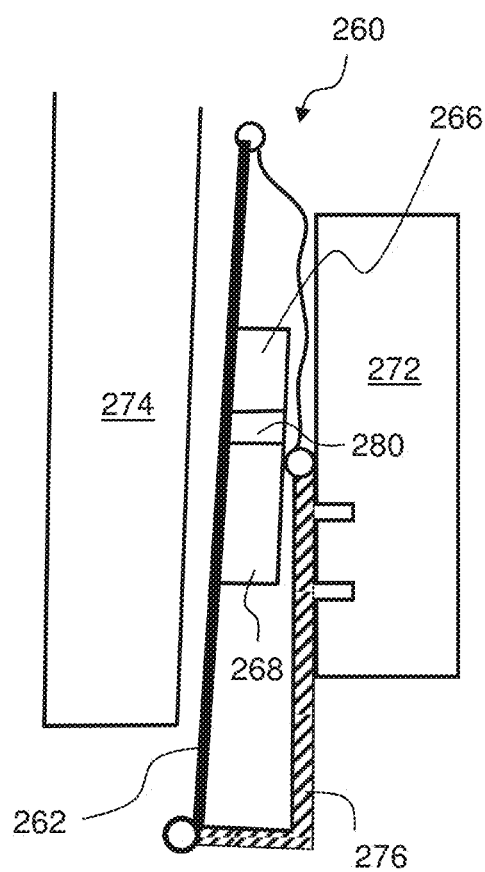

A representative example of such configuration according to some embodiments of the present invention is illustrated in FIGS. 6A and 6B. Shown in FIGS. 6A-6B is an active separation control system 260 with a fluidic oscillatory actuator 270 having an ejector member 268 and an oscillator member 266. System 260 can be similar to system 200 above, or it can be of any other type suitable for providing fluid actuation in the form of unsteady flow. For example, system 260 can be similar to the system described in U.S. Published Application No. 20100194142 or International Publication No. WO WO2011/077424, the contents of which are hereby incorporated by reference.

System 260 is mounted on a rear door 272 of a vehicle, such as a trailer or the like. For clarity of presentation only a side wall 274 of the vehicle is illustrated. Door 272 is connected to a rotatable bar 276 which is allowed to rotate over a range of more than 180 degrees, e.g., 200 degrees, or 220 degrees, or 240 degrees or more. FIG. 6A illustrates system 260 when the door is closed, and FIG. 6B illustrates system 260 when the door is open.

The flexibility of system 260 is optionally and preferably achieved by means of a flexible sheet (e.g., a metal sheet) 262 which form a contour in the shape of the active separation control system (e.g., a section of a cylinder or a cylinder, shown an arc in FIG. 6A). In various exemplary embodiments of the invention the ejector member is attached at the inner part of one flexible sheet member and the oscillator member is attached at the inner part of the other flexible sheet member. The ejector member and oscillator member can be connected via a flexible tube 280 which serves as a joining channel. When system 260 comprises a feedback and/or synchronization conduit (not shown, see FIG. 2), these conduits are preferably flexible.

Optionally, a cable 282 connects the end of the sheet 264 to the door 272 so as to maintain the location of system 269 fixed against the door. When the door is closed (FIG. 6A), the cable becomes tight and the flexible sheet assumes the required shape. Opening the door releases the tension on the cable, so that the flexible sheet becomes less curved (e.g., generally flat) and is shifted closer to the door, so that the cable becomes loose (FIG. 6B).

The present inventors contemplate several configurations for enhancing the efficiency and/or compliance of system 20. The Examples section that follows provides several efficiency enhancement considerations. As a representative example, the frequency of the oscillatory actuators is optionally and preferably X times (e.g., twice) the expected vortex shedding frequency of fluid at the vicinity of system 200, wherein X is from about 1.5 to about 3.5 more preferably from about 1.8 to about 3.2.

As another representative Example, the separation between adjacent fluidic oscillatory actuators is about $X \cdot v \cdot St/f$, wherein v is the expected velocity of fluid at the vicinity of the system, f is an expected vortex shedding frequency of fluid at the vicinity of the system, St is the expected Strouhal number characterizing the fluidic oscillations, and X is a dimensionless number from about 0.5 to about 4 or from about 1 to about 3 or from about 1 to about 2.

It is expected that during the life of a patent maturing from this application many relevant unsteady fluidic actuators will be developed and the scope of this term is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Drag Reduction Using Active Flow Control

This Example describes an active separation control system, packaged as an add-on device attachable to the rear end of a vehicle, such as a large truck trailer. The system can reduce the aerodynamic drag by about 20%.

Following is a description of a comprehensive study that included, in combination, actuator development, computational fluid dynamics and bench-top, as well as wind tunnel testing. The study employed an array of 15 newly developed suction and oscillatory blowing actuators housed inside a circular cylinder attached to the aft edges of a generic 2D truck model.

Introduction

AFC is a fast-growing, multidisciplinary science and technology thrust aimed at altering a natural flow state to a more desired flow state (or path). Flow control was simultaneously introduced with the boundary layer concept at the turn of the 20th century. Though the fluid mechanics aspect can be robust, steady-state flow control methods were proven to be of inherently marginal power efficiency, and therefore limited the implementation of the resulting systems. Unsteady flow control using periodic excitation and utilizing flow instability phenomena (such as the control of flow separation [2]) has the potential of overcoming the efficiency barrier. Separation control using periodic excitation at a reduced frequency of the same order, but higher than the natural vortex shedding frequency of bluff bodies (such as an airfoil in post-stall or a circular cylinder), can save 90% to 99% of the momentum required to obtain similar gains in performance compared to the classical method of steady tangential blowing. The present embodiments are useful for increasing the efficiency and simplifying fluid related systems. When applied, e.g., to a fleet of trucks, these embodiments can allow saving in fuel consumption, which is advantageous from the standpoints of economy and environmental considerations.

The progress in the development of actuators, sensors, simulation techniques and system integration and miniaturization enables using wide bandwidth unsteady flow control methods in a closed-loop AFC (CLAFC) manner. (See e.g., Ref. [3] for a comprehensive review of the subject.) Experimental demonstrations are required to close the gap between the current theoretical understanding, the computational capabilities and real-world problems. The study described in the present example brings together AFC expertise, specifically actuator development and implementation for separation control, closer to real-life industrial applications.

At highway speeds, the aerodynamic drag of a vehicle is responsible for roughly 65% of the fuel consumption, making the potential fuel savings about 10%, taking into account the energy cost of the AFC system. There has been considerable effort in the US to reduce the fuel consumption of trucks using shape changes, simple add-on devices and steady state AFC methods [4]. It is recognized by the present inventors that those techniques have inherent limitations and are insufficient. Reference [4] cites several research efforts focused on truck trailer drag reduction. Adjustable inclination flat plates are attached at the truck lee side. These plates, however, are rather large, heavy and expensive, and their size raises functionality and compatibility issues. Periodic excitation was also mentioned in Ref [4]. Steady blowing [10] was also applied to a modified aft region of a truck trailer and resulted in significant aerodynamic drag reduction, but at a marginal to zero or mostly negative energy efficiency due to reasons identified in [2].

The study described below was aimed at applying AFC technology as an "add-on" device attached to the aft body of the vehicle. Suction and Oscillatory Blowing (SaOB) AFC actuators are used for drag reduction of heavy ground transportation systems. The above fluidic device is a combination of an ejector (jet-pump) and a bi-stable fluidic amplifier [Arwatz et al (2007)]. The current study was assisted by a computational fluid dynamics (CFD) to narrow the huge parameter space. After completing the actuator development and adaptation to the speed range relevant to trucks, three stages of experiments were performed on a circular cylinder, the generic bluff-body. These studies resulted in a significant reduction of drag due to delay of boundary layer separation.

A wide range of boundary conditions were tested and only the common results to all conditions were considered as valid. Successful wind tunnel demonstration on a two-dimensional (2D) equivalent of a blunt truck trailer model was subsequently performed. The technology of the present embodiments successfully provides aerodynamic drag reduction, particularly of heavy road vehicles and aeronautical systems.

Description of the Experiment

Figure 7:
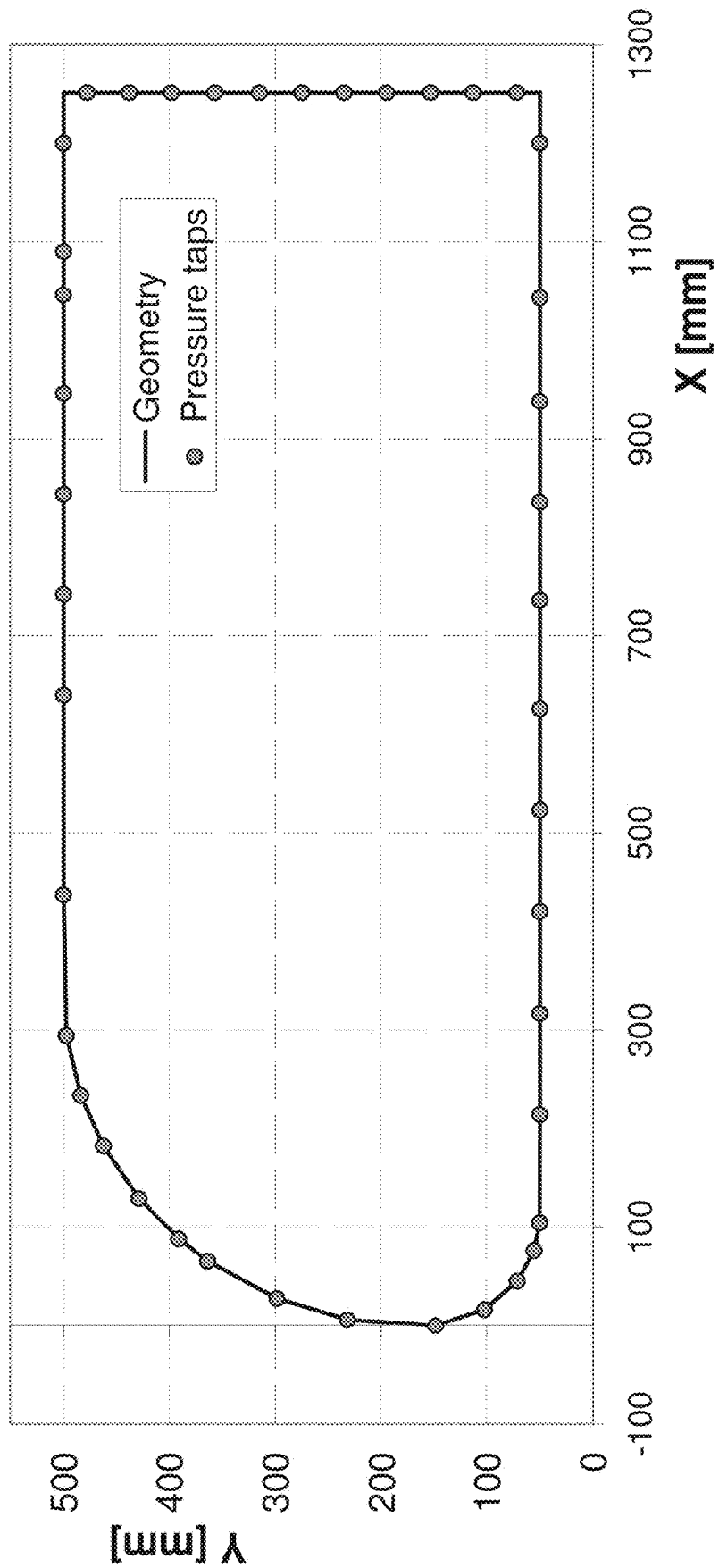
FIG. 7 is a schematic illustration of a two-dimensional truck model used in experiment performed according to some embodiments of the present invention.

The wind tunnel experiments were performed on a generic 2D equivalent model of a large truck, along the lines of the GTS model [15]. FIG. 7 presents a cross section of the model, showing also the location of the 43 pressure taps.

The model height (H) is 450 mm and its length is 1250 mm. It spans the entire width of the wind tunnel test section, b=609 mm. The model is made of aluminum beams and ribs and a skin of 2 mm thick aluminum plates. The significant interference with the wind tunnel has not been taken into account in any manner.

Figure 16A:
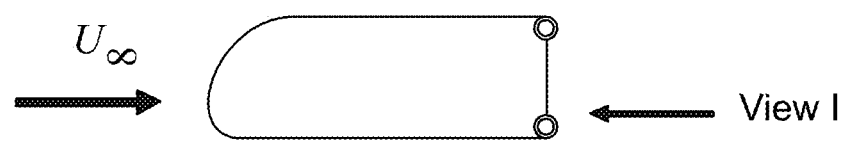
FIG. 16A is a schematic illustration of a 2D truck model with two control cylinders, used in an experiment performed according to some embodiments of the present invention.
Figure 16B:
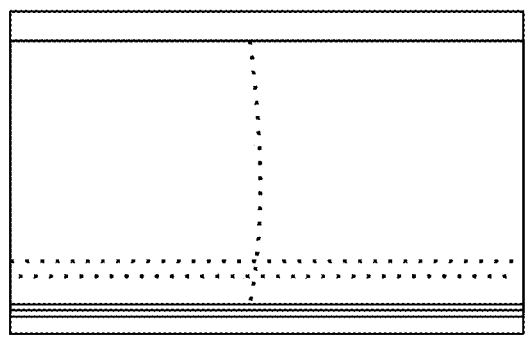
FIG. 16B is a drawing of an image showing a close-up rear-view of the lower aft-corner control cylinder (see "view I" in FIG. 16A)

During the 2D truck experiments the ceiling static pressures were measured and could be used for evaluation of the wind tunnel interference with the use of future CFD effort. It is argued that since the flow accelerates more around the model, with respect to free flow conditions, the AFC results are conservative since the AFC effects are proportional to the flow linear momentum at the separation points. For control purposes, one or two circular cylinders were attached to the aft region of the truck model. The cylinders were 76.2 mm in diameter and spanned the 609 mm of the wind tunnel. The cylinders were installed so that they were tangent to the aft body corners and extended one radius behind the aft plate line, their centers one radius below the upper cover plate or above the lower cover plate, respectively. See FIG. 13A with only the upper control cylinder sketched. The upper control cylinder was installed with an array of 15 SaOB actuators. An array of 96 suction holes with diameter of 2 mm and spacing of 6 mm were drilled in the cylinder. The wall thickness was close to 10 mm, so the flow resistance was high. Fraction of the outer flow was sucked into the cylinder due to the sub pressure created by the SaOB actuator array. The entire flow rate (the sum of the inlet and entrained-sucked flow) was ejected alternatively out of two tangential, 1.7 mm high, pulsed blowing slots connected to each actuator. Each actuator was 28 mm wide and it controlled about 40 mm of the span of the cylinder. The lower control cylinder was used only for steady-suction and was connected to an external suction pump. It had two staggered rows of 96 holes 2 mm diameter each, spaced 7.5 deg apart along the cylinder arc (FIGS. 16A and 16B).

A simulated road was placed under the 2D truck in some of the tests. The plate was positioned 67 cm upstream of the model and was 280 cm long, 4 mm thick, extending 90 cm behind the model. A 3D wake rake was positioned 120 cm downstream of the model. It measured 29 total pressures and 2 static pressures, one close to each sidewall. The wake rake was mounted on a Y-axis traverse allowing vertical motion, with typical resolution of 20-25 mm.

The experiments were performed in the Meadow-Knapp low-speed wind tunnel. The speed range is 4-60 m/s, the turbulence level is about 0.1% and the test section dimensions are 1.5 m (high) by 0.61 m (wide) and 4.25 m long. Pressures were measured by a PSI Inc. pressure scanner with 128 ports at a resolution of 0.001 psi. Tunnel dynamic pressure was measured by a Pitot-Prandtl tube, positioned 110 cm upstream of the model leading edge on the tunnel ceiling, connected to a Mensor pressure transducer (10" water full scale and resolution of 0.06%). The Reynolds number was monitored to 1% tolerance and unsteady pressures were also measured on the model aft region, to identify unsteady effects. The tunnel temperature was 24±2° C. Air density and viscosity were calculated using standard formulae and the ambient temperature and pressure.

Suction and Oscillatory Blowing (SaOB) Actuator

Figure 8A:
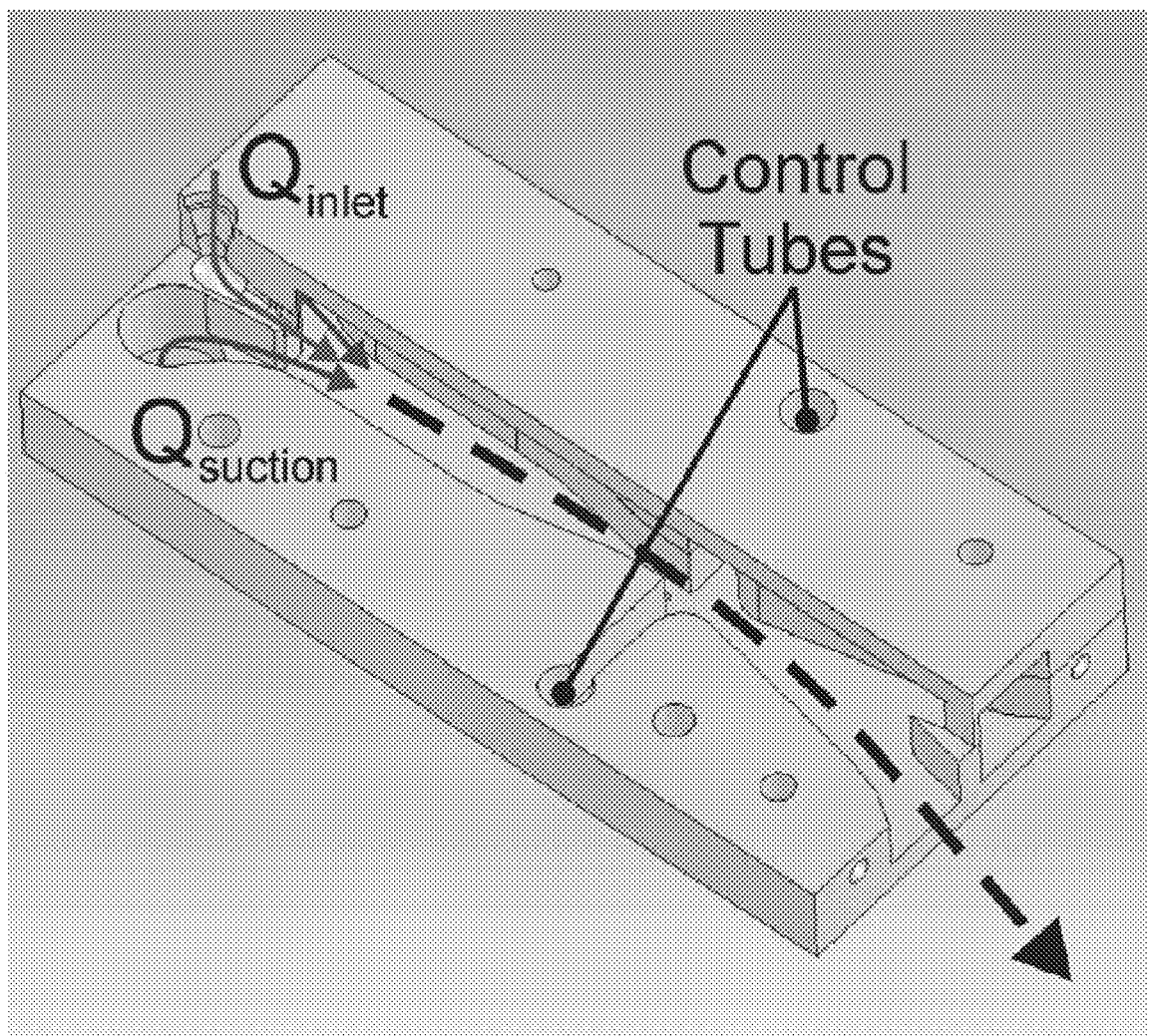
FIGS. 8A-8C are schematic illustrations of an actuator used in experiment performed according to some embodiments of the present invention.
Figure 8B:
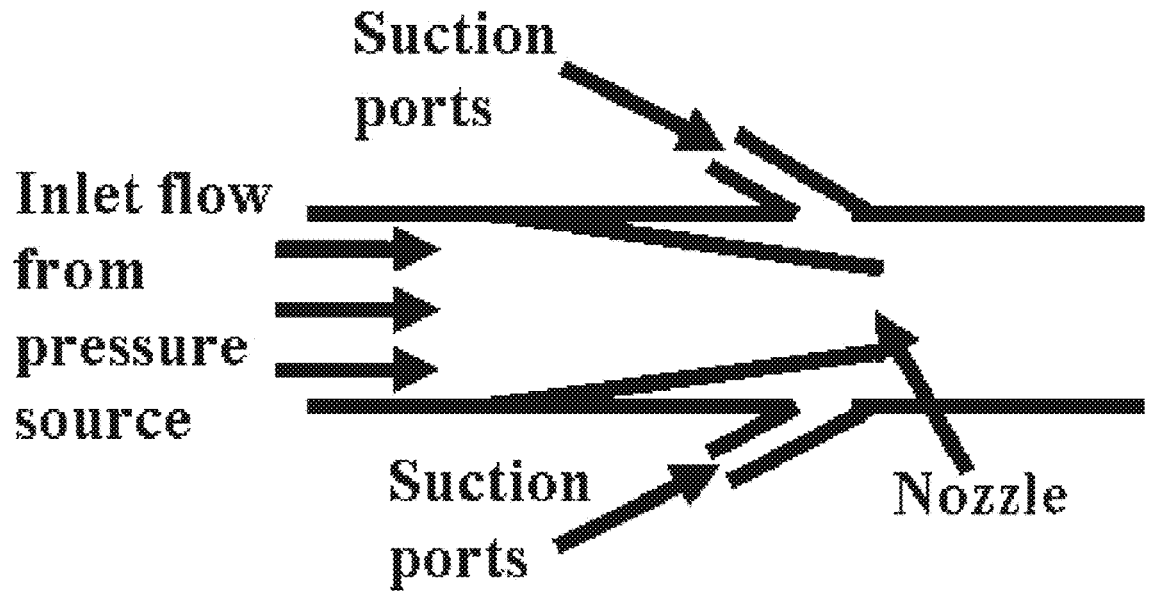
Figure 8C:
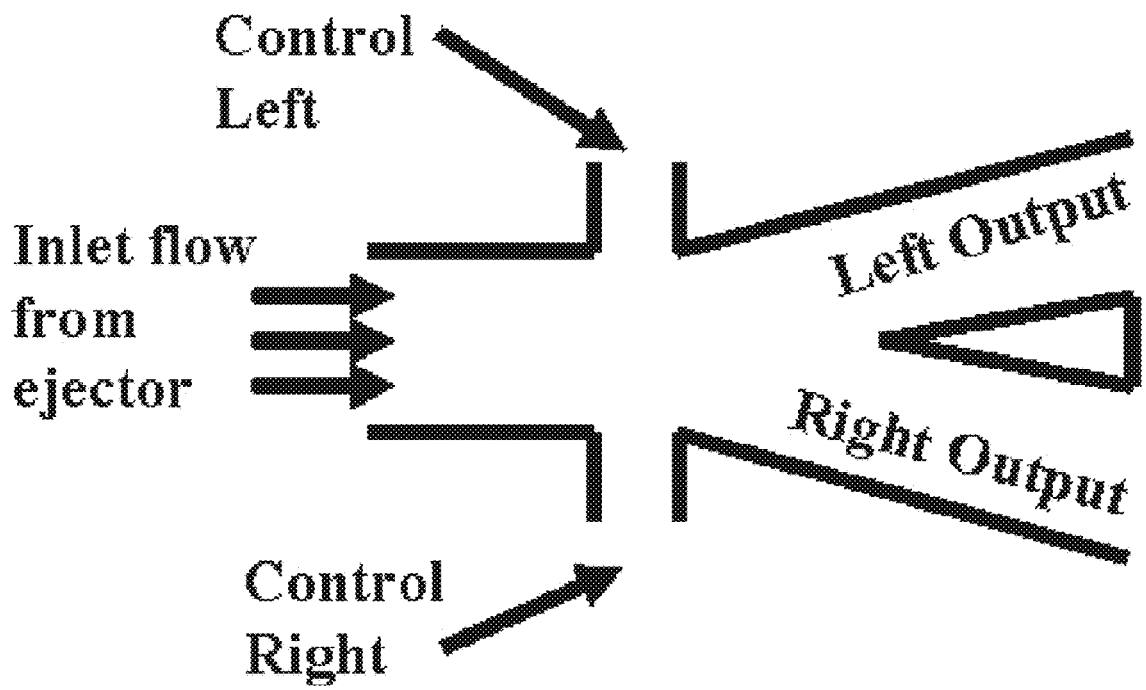

The SaOB actuator is described in U.S. Pat. No. 7,055,541. Several size actuators were developed. A theoretical model for the valve operation was validated (Arwatz et al, 2007). The actuator is a combination of a bi-stable fluidic oscillator member connected downstream of an ejector member. A simplified isometric view of the actuator is shown in FIG. 8A and schematic illustrations explaining the principle of operation of the ejector and oscillator are shown in FIGS. 8B and 8C, respectively. The purpose of the ejector is to create a suction flow, by amplifying the flow entrained into the valve. It has been shown that the ejector is indeed increasing the flow rate by a factor up to three with its entrances unrestricted. To create self-oscillations, the two control ports were connected by a short tube, without any moving part or energy expenditure. The tube was later replaced by an S-shaped channel machined in a plate on which all the actuators were installed (referred hereafter as "mounting plate"). The SaOB actuator has a wide and appropriate frequency range (0.1 to 1.4 kHz) depending on the ejector nozzle shape, the length of the feedback tube and the inlet flow-rate (Arwatz et al, 2007). Near-sonic actuator exit velocities have been measured, but currently the exit velocities are of the same order as the free-stream velocities. The inlet flow rate is controlled by a pressure regulator connected to shop air supply—to be replaced by the truck pneumatic system—by flow extracted from the truck turbocharger or by an auxiliary system connected electrically to the truck alternator or mechanically to the rear wheels. The valve operation is insensitive to rain or dust conditions.

To fit the valve into the cylinder while minimizing the pressure drop across it, the ejector nozzle was designed to have a short converging straight geometry and the mixing chamber between the ejector and the oscillator were shortened (FIG. 8A). Following these modifications the valve was bench-top tested, initially only with exit restrictions, simulating the assembly in the control cylinder.

Figure 9A:
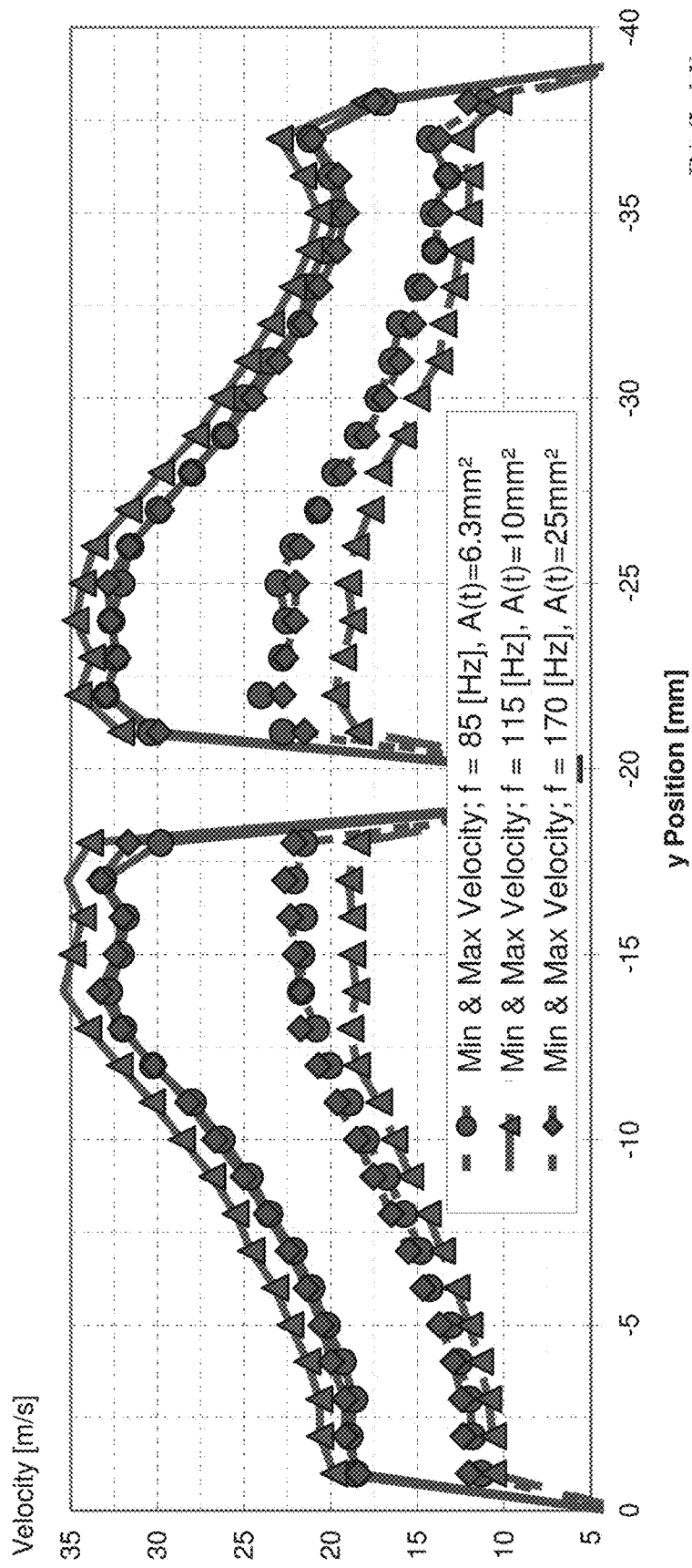
FIGS. 9A-9B show maximum and minimum flow velocity out of a single actuator with an exit assembly as obtained in experiment performed according to some embodiments of the present invention.
Figure 9B:
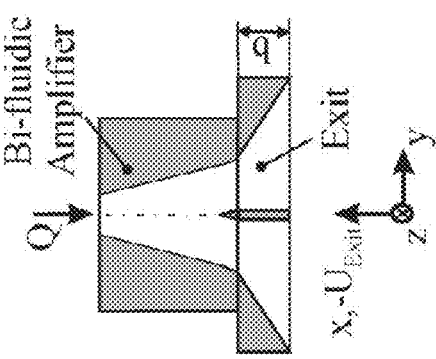

FIGS. 9A-9B show the maximum and minimum flow velocity out of a single SaOB actuator with an exit assembly simulating the conditions that will prevail in the "add-on" device as well as in the control cylinder at half scale. The exit velocities were measured by a hot wire that was traversed along the exit slot. The cross-section of the feedback tubes (all with L=80 mm) was altered during those tests. As shown, the cross section of the feedback tube has a strong effect on the oscillation frequency. It has a weaker effect on the switching quality κ, defined as:

$$\kappa = \frac{U_{max} - U_{min}}{U_{average}}.$$

Circular Cylinder with the SaOB Actuator Array

Figure 10A:
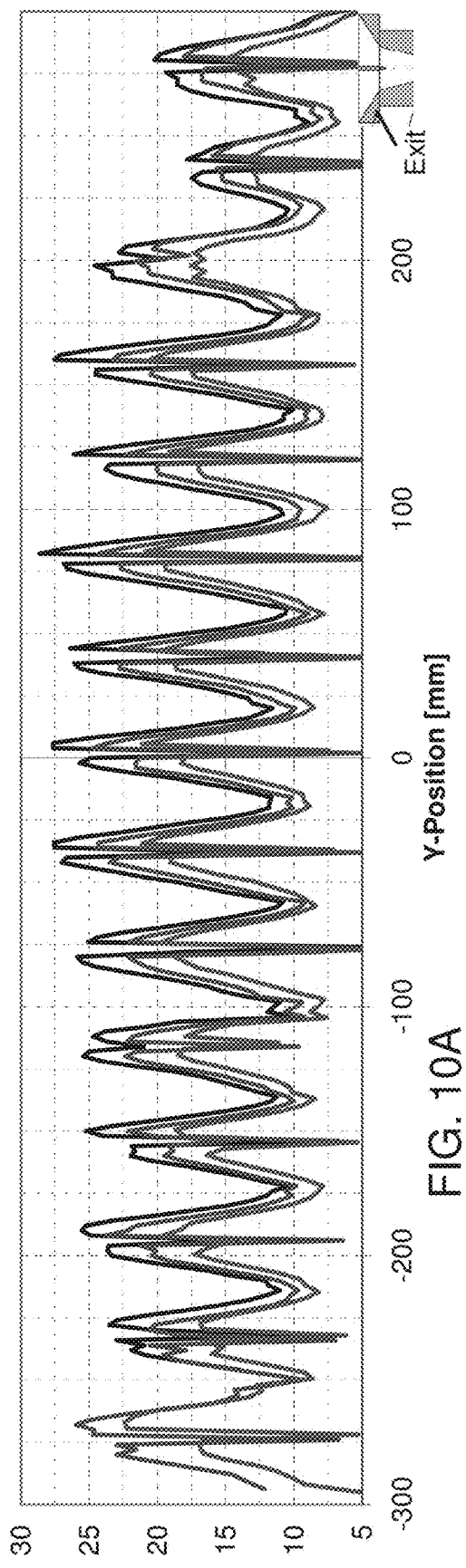
FIGS. 10A and 10B show the velocity (FIG. 10A) and frequency (FIG. 10B) of oscillation of an actuator array installed in the circular cylinder and tested on a bench-top set-up during an experiment performed according to some embodiments of the present invention.
Figure 10B:
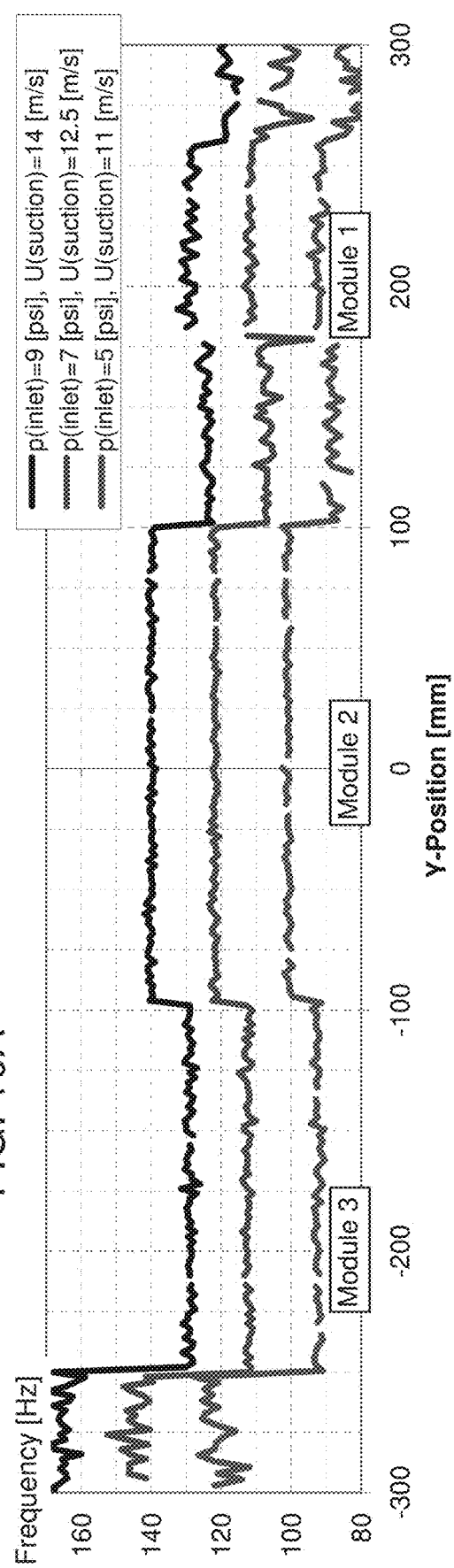

The 15-valve array was mounted on a plate, providing inlet pressure to all the valves, feedback for each valve self-oscillation, and synchronization tubes between the valves. The cross section of the feedback tubes was 5.7 mm² and their length was maintained at 80 mm. FIGS. 10A and 10B show the velocity (FIG. 10A) and frequency (FIG. 10B) of oscillation of an actuator array installed in the circular cylinder and tested on the bench-top set-up. The valves were not all synchronized, the frequencies of the central 13 valves deviated by no more than 10%, and the peak velocities deviated by a maximum of 20%.

Figure 11A:
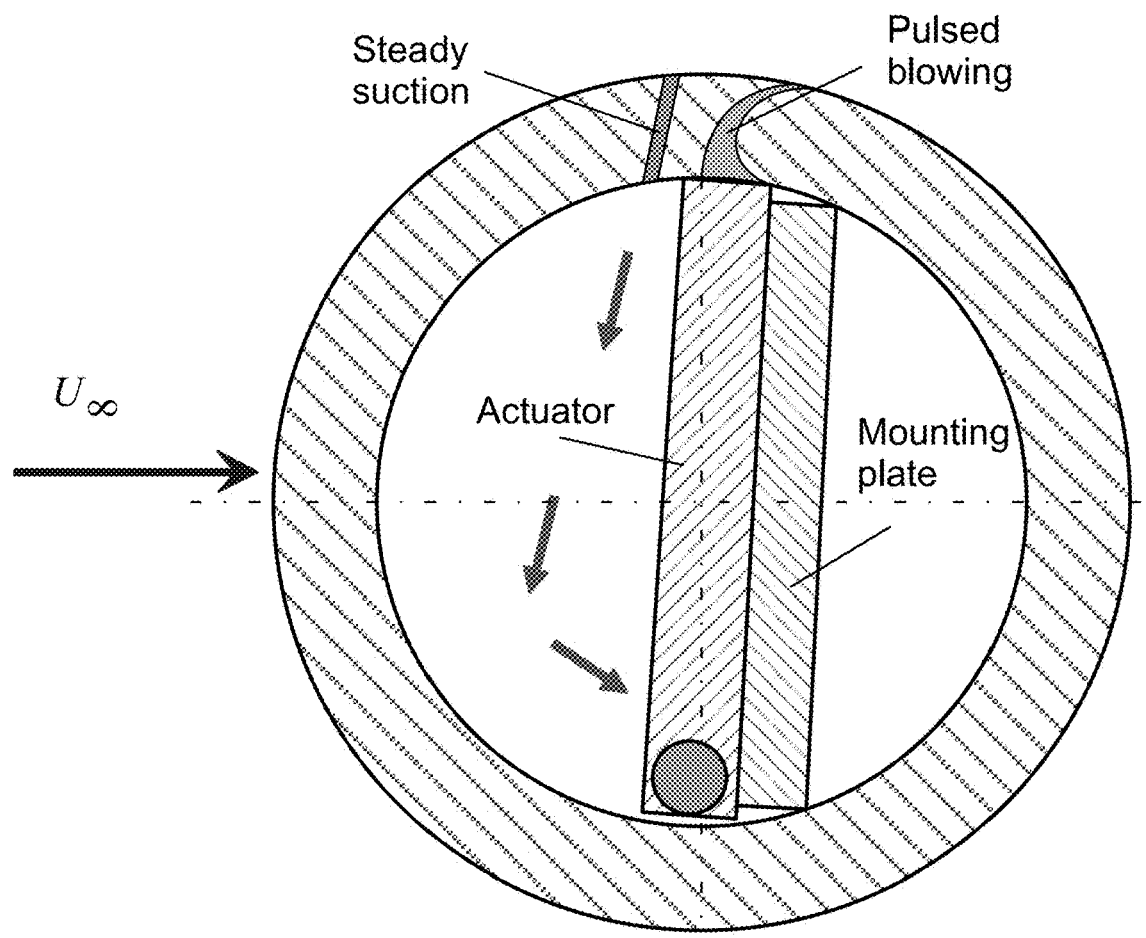
FIG. 11A is an illustration of a cross section of a 15-valves actuator array as installed inside the cylinder, and used an experiment performed according to some embodiments of the present invention.

It has been established that the drag reducing capability of steady-suction through a 2D slot and later a row of holes in a wide range of boundary conditions. It has been also established that a 15 deg delay in separation region on the circular cylinder at Re=100,000 and Re=150,000 (associated with the target highway driving speeds for the current cylinder diameter) is possible with suction magnitude of about half the free-stream velocity. Re at 90 km per hour is about 200,000 for the device diameter as a char length. This enabled the definition of the configuration shown in FIG. 11A, which is an illustration of a cross section of the 15-valves actuator array as installed inside the cylinder.

The suction holes are located 15 deg upstream of the pulsed blowing slot. The array of 15 SaOB actuators is mounted inside the 76.2 mm diameter cylinder. Inlet flow is provided via common channel feeding all the ejectors' jets. These create low pressure in the half-cylinder to the left of the valve array, sucking flow through the holes. The entire flow is then ejected through the pulsed blowing exit slots. The oscillation frequencies are in most cases larger than the natural vortex shedding frequencies on a circular cylinder at the current velocity range and significantly higher than the 2D truck model vortex shedding frequency.

Figure 11B:
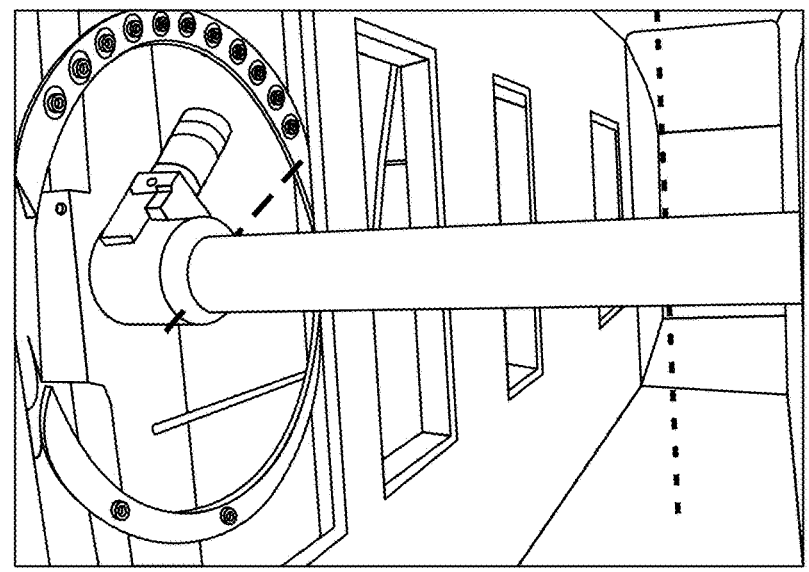
FIG. 11B is a drawing of an image of an experimental set-up including a cylinder in a Meadow-Knapp wind tunnel.

Three series of wind tunnel experiments were performed on the circular cylinder. FIG. 11B is a drawing of an image of the experimental set-up including the cylinder in the Meadow-Knapp wind tunnel.

Figure 12A:
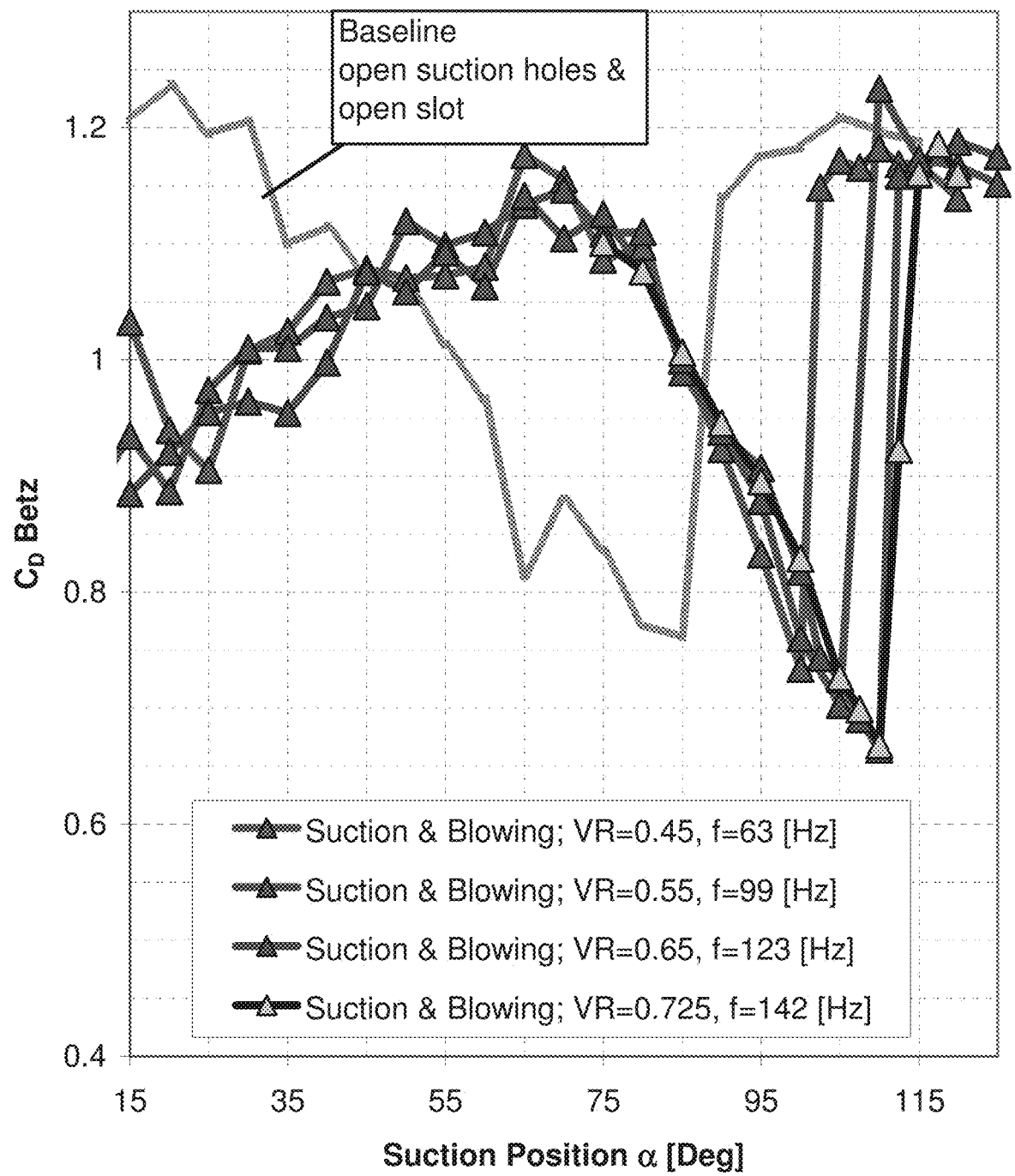
FIGS. 12A-12B show cylinder drag coefficient as a function of suction position in free laminar flow conditions (no truck model), as obtained in an experiment performed according to some embodiments of the present invention.
Figure 12B:
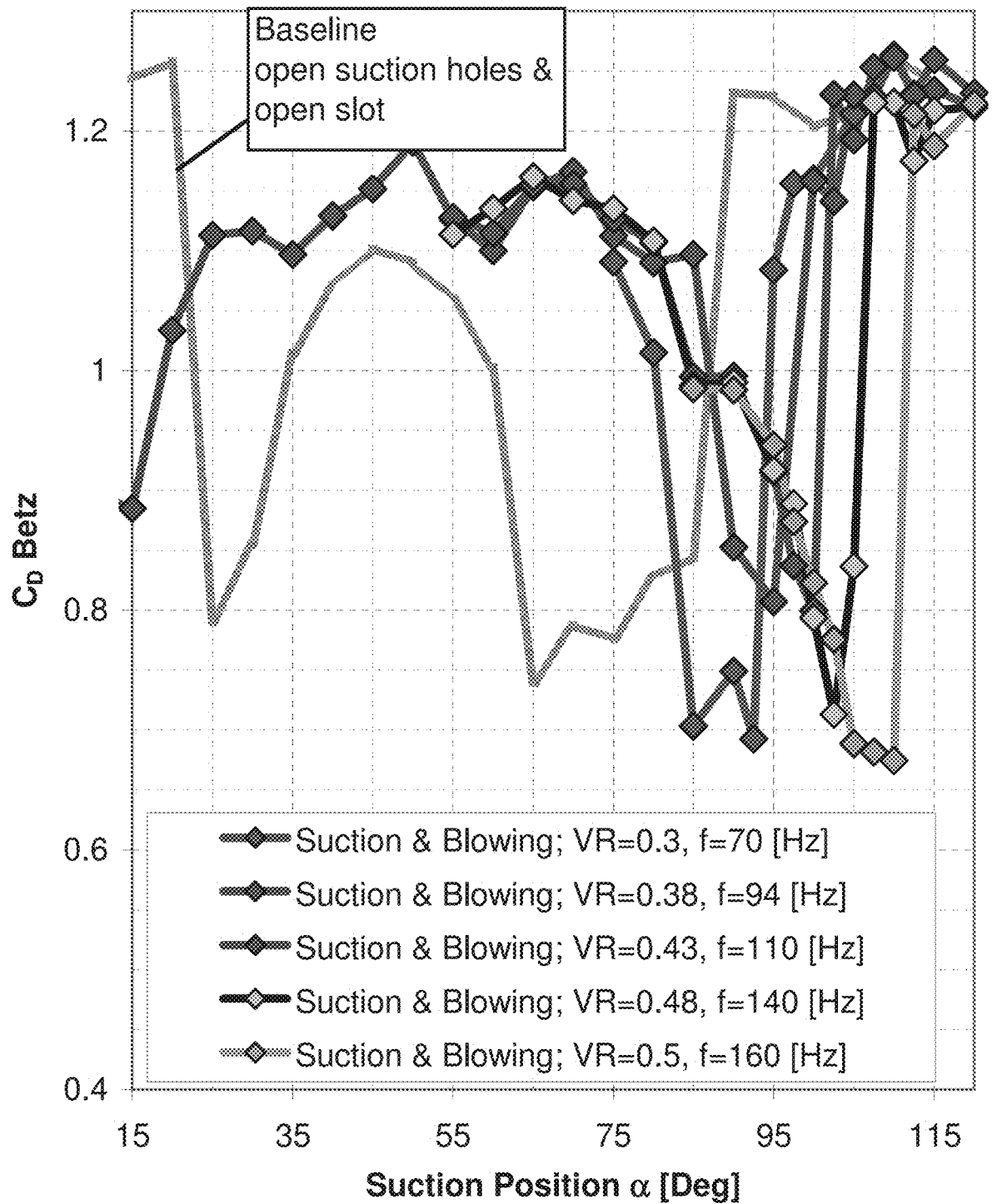

The cylinder was tested and a sample of the drag reduction data is presented in FIGS. 12A-12B. The data shown in FIGS. 12A-12B indicates a drag coefficient reduction from about 1.1 to about 0.7, or a relative drag reduction of about 35%. This is obtained when the suction holes are located at about 110 deg (relative to the free-stream direction) on the cylinder and the pulsed blowing slot at are positioned 15 deg downstream (at about 125 deg), where 90 deg is the summit of the cylinder. The energy efficiency of this drag saving, which was measured at flow speed comparable to the highway speed of trucks, indicates net positive energetic efficiency.

Two-Dimensional (2D) Truck Experiments

Two-Dimensional (2D) Truck with SaOB Cylinder at Upper Aft Corner

Figure 13A:
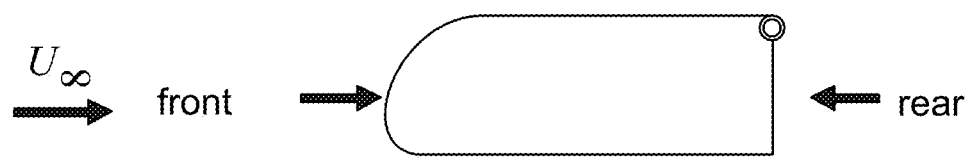
FIGS. 13A-13D show a 2D truck model with an actuator installed on its upper aft corner, used in an experiment according to some embodiments of the present invention.
Figure 13B:
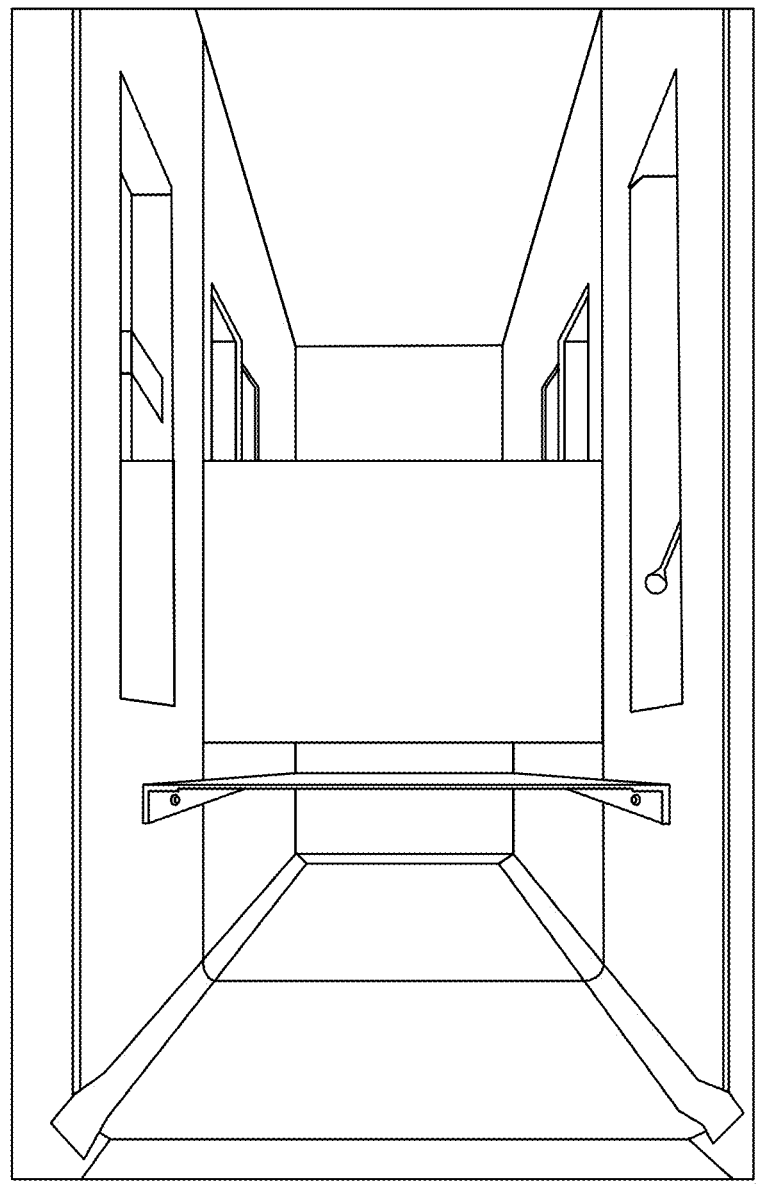
Figure 13C:
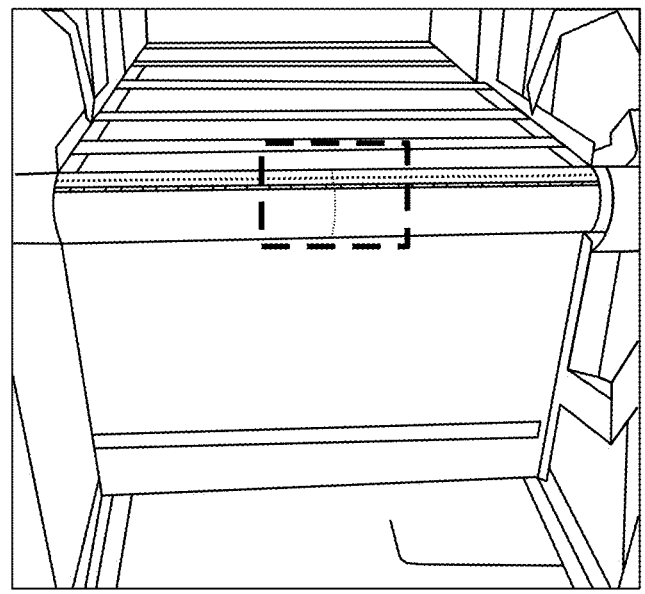
Figure 13D:
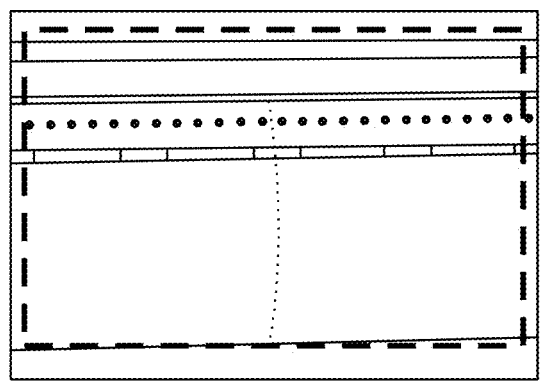

FIGS. 13A-13D show a 2D truck model with an SaOB cylinder installed on its upper aft corner according to some embodiments of the present invention. FIG. 13A is a schematic illustration showing a cross-section view and incoming flow $U_\infty$ from left to right, FIG. 13B is a drawing of an image showing a front view of the model once installed in a Meadow-Knapp tunnel 50-55 mm above the simulated road, FIG. 13C is a drawing of an image showing a rear-view of the model including the back plate and SaOB instrumented cylinder on the top-rear end, and FIG. 13D is a magnification of the white dashed rectangle of FIG. 13C.

The vertical distance between the model and the floor was allowed to increase from 50 to 55 mm in order to compensate for boundary layer growth. It was validated that the boundary layers did not restrict the free flow under the model. Wheels or a moving floor were not used. These effects seem secondary since most of the effort was spent on the upper aft corner, least effected by the wheels or simulated road, moving or stationary. However, the mere presence of the simulated road allowed simulating a side view of the truck driving on a road. Several 50 mm wide roughness strips (grit #60) were placed on the top and bottom plates of the 2D truck model, to reduce Reynolds number effects.

An array of 96, 2 mm diameter, suction holes was positioned 15 deg upstream of a 1.7 mm (nominally) pulsed blowing wide slot on the cylinder that was allowed to rotate for optimal positioning of the actuation locations (FIG. 13D). The slots allowed almost tangential downstream-directed introduction of the pulsed blowing excitation. Each actuator controlled a span of about 40 mm with two exits, as shown schematically in the FIG. 9B. The trailing edge of the top and bottom cover plates were machined to create a back-step no thicker than 0.5 mm, allowing a smooth transition of the flow from the covers to the control cylinders.

The add-on device according to some embodiments of the present invention has a shape that resembles a semi- to quarter-cylinder attached to the back side of a truck trailer. The advantage of having a complete cylinder at the experimental stage is the capability to conveniently alter the actuation location, which is shown to be very sensitive on the free cylinder (FIGS. 12A-12B) and also in the results related to trucks, presented below.

At this stage of the investigation the angular distance between the suction holes and pulsed blowing slots was fixed, 15 deg.

The drag of the 2D truck model was calculated from the integration of the pressures around the model and from a 3D wake survey performed 1.2 m behind the model. The wake flow was found to be reasonably 2D and the agreement between the two methods of drag evaluation was better than 2% in most cases, and in the absence of the simulated road. The drag reduction magnitudes were similar when evaluated either with the wake integration method or from the pressure drag. The aft body "add-on" device was tested as a circular cylinder, due to the larger size and ease of installation of the 15 SaOB valve array inside it. A secondary major consideration was the capability to rotate the cylinder, bringing the holes/slot to an optimal location.

Figure 14A:
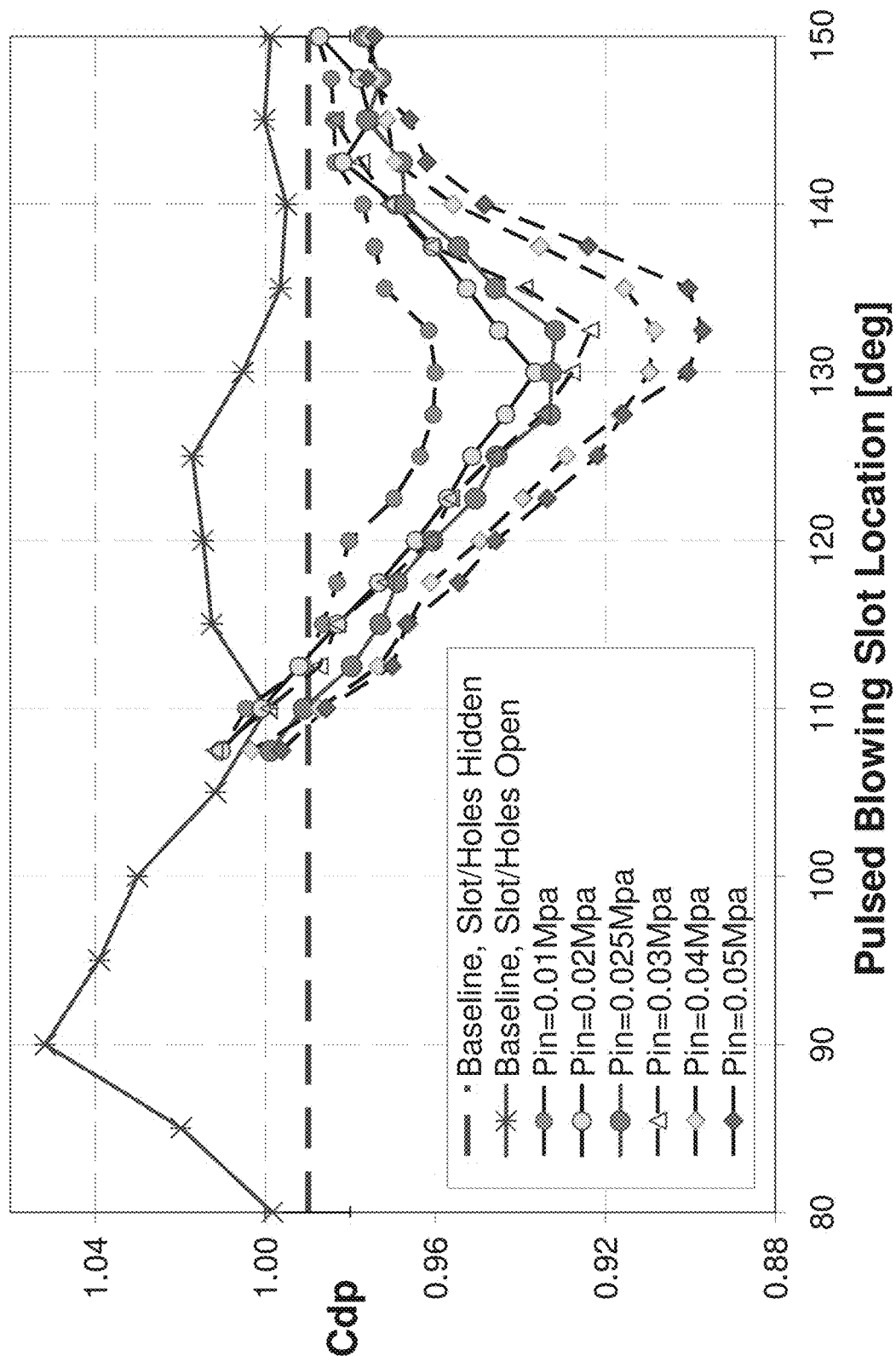
FIGS. 14A-14B show the effect of the actuation on the drag and required power, as measured in an experiment performed according to some embodiments of the present invention.

FIG. 14A shows the effect of the SaOB actuation on the drag of the 2D truck model at U=25 m/s for different actuation levels indicated by the inlet pressures. The actuation location is altered via cylinder rotation, where 90 deg is the cylinder-upper plate junction.

Figure 14B:
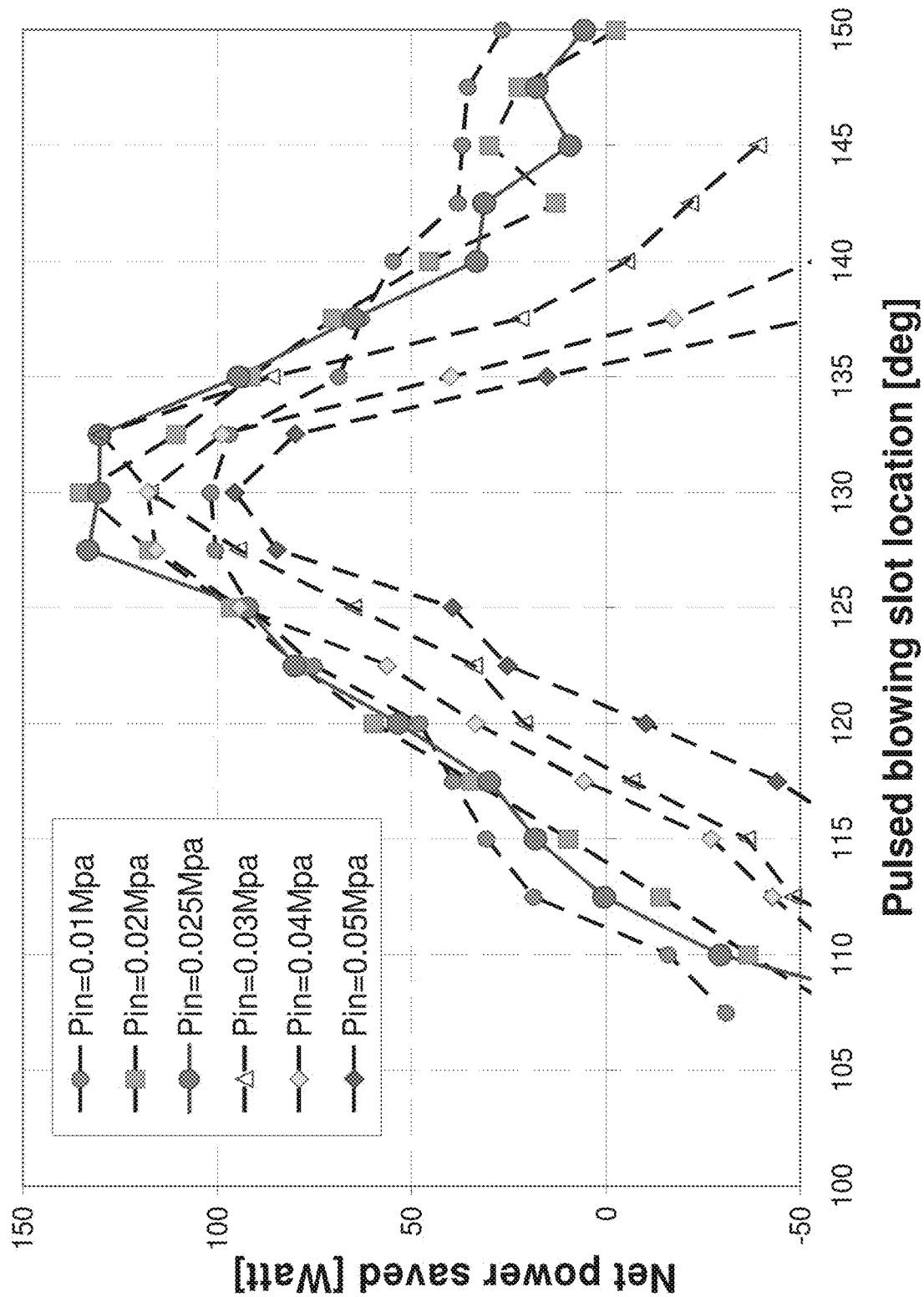

FIG. 14B shows the effect of the SaOB actuation on the required power to propel the 2D truck model at U=25 m/s for different actuation levels indicated by the inlet pressures. The actuation location is altered via cylinder rotation, where 90 deg is the cylinder-upper plate junction. Reference power is about 2.57 kWatt.

The addition of the passive control cylinder at the upper aft corner had a drag reducing effect of about 5% with respect to the baseline configuration shown in FIG. 7. The slot was just exposed when its location was 90 deg. With the control cylinder present but when the slot was hidden, Cdp=0.99±0.01. The passive effect of the slot, and its associated discontinuity, can be seen by the drag increase between 90 and 100 deg. At larger slot locations the drag returns to its undisturbed value, with a possible drag penalty of 0.01-0.02. At slot positions greater than 105 deg both slot and suction holes are exposed. FIGS. 14A-14B show results of different levels of control applied by the array of SaOB actuators, with increasing level of input pressures, as indicated in the legend. A significant drag reduction develops in the range of tested pressures, up to 0.05 MPa. An optimal holes/slot location can be identified around 130-132.5 deg, slightly increasing with the magnitude of the control authority. These results were obtained with a simulated road, similar to a truck with control applied only from the top aft edge of the trailer. Optionally, a second control cylinder at the lower aft edge with simulated road can be added.

Following are energy cost considerations. The net power saving was calculated according to: Power saved=$0.5\rho U_\infty^3 S\Delta C_d - P_i Q_i/\eta$. Where $\rho$ is the air density, $U_\infty$=25 m/s is the free-stream velocity, S=0.61×0.45 m² is the 2D truck cross-section area, $\Delta C_d$ is the drag reduction at the same holes/slot position with respect to the baseline uncontrolled condition. The control power was taken as the product of the inlet pressure (Pi, measured at the supply line) and the inlet flow rate (Qi, measured by an orifice flow meter at the pressure regulator and neglecting the effect of the larger static pressure on the flow rate, making the actual flow rates smaller by 5-20% than those currently cited depending on the excess pressure). The pumping efficiency, $\eta$, was taken as 75%, as in many common low-pressure compressors. The control flow was provided by the lab shop air through a computer controlled pressure regulator. The data presented in FIG. 14B shows a rather insensitive (to the inlet pressure) peak power saving of around 130 watts for inlet pressures of 0.02-0.025 MPa. With either lower or higher pressure levels, the power efficiency decreases.

The data presented in FIGS. 14A-14B were obtained at a fixed free-stream velocity of 25 m/s.

Figure 15A:
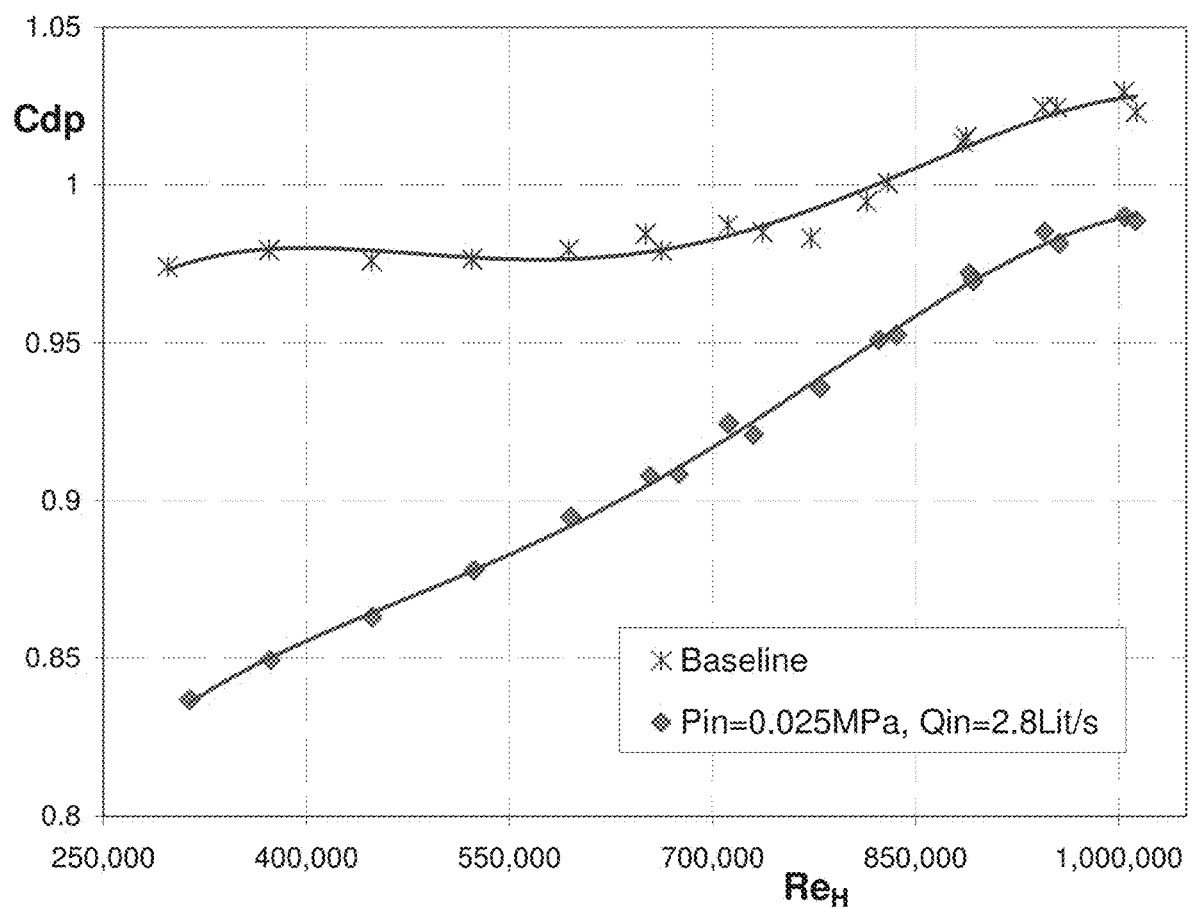
FIGS. 15A-15B show the effect of actuation on the baseline and controlled drag of the 2D truck model, as measured in an experiment performed according to some embodiments of the present invention.

FIG. 15A shows the effect of the SaOB actuation on the baseline and controlled drag of the 2D truck model as a function of the height Reynolds number for fixed actuation level. The actuation location is: pulsed blowing slot at $\alpha$=130°, suction holes at $\alpha$=115°, Pin=0.025 MPa, Qin=2.8 Lit/s where 90 deg is the cylinder upper plate junction.

The simulated road was present in this experiment. The baseline drag slightly increases, from 0.98 to 1.02 with Re (based on the model height and the free-stream velocity) increasing from about 200,000 to about 1,000,000. Note that at the larger Re range the drag reaches a plateau. This Re, based on the height of the model, is considered minimal for Reynolds number free results. With fixed level of inlet pressure and fixed actuation locations a significant drag reduction over the entire Re range was observed. It is expected that the magnitude of the drag reduction decreases as Re increases, due to the relative decrease between both the suction and pulsed blowing magnitudes when normalized by the free-stream velocity. Aerodynamic drag reduction of about 20% is possible at low speeds, decreasing to about 5% at the highest speeds considered operational and legal for large trucks in the US highway system.

Figure 15B:
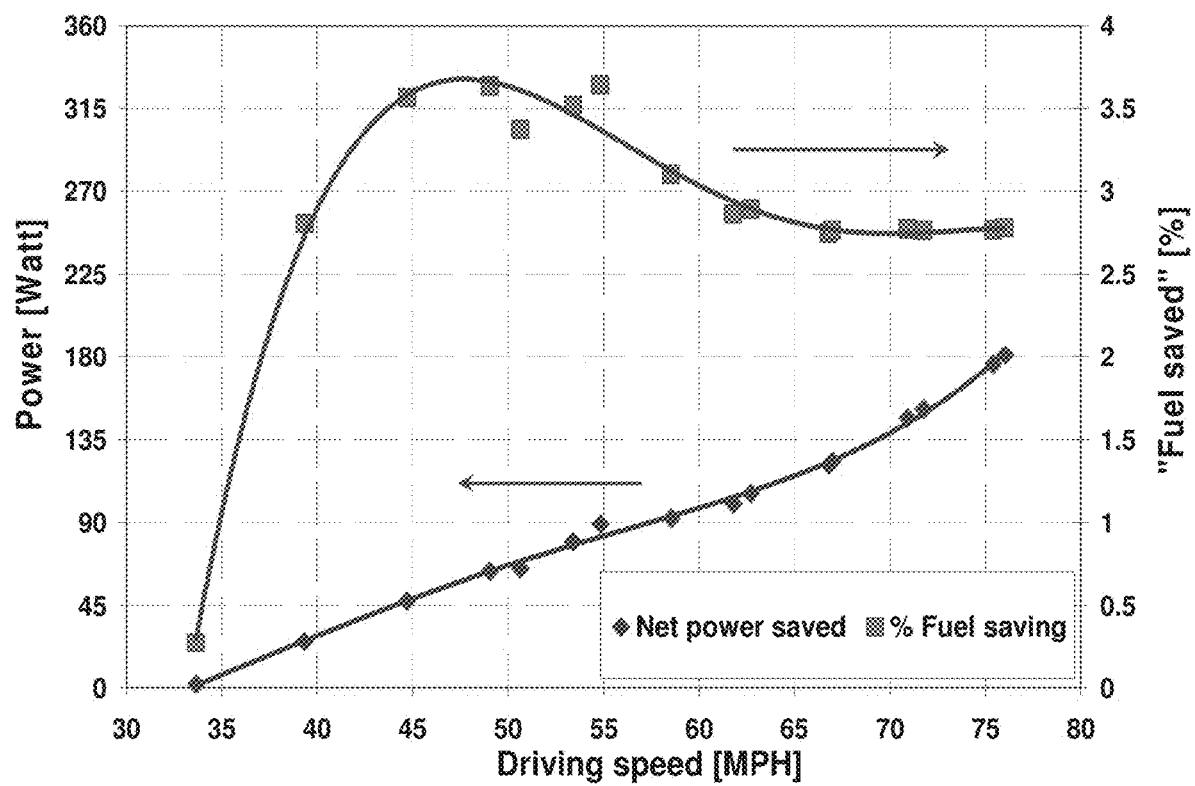

FIG. 15B shows the net flow power saved and equivalent "fuel" saving of the controlled 2D truck model as a function of the driving speed for fixed actuation level. The actuation location is: pulsed blowing slot at $\alpha$=130°, suction holes at $\alpha$=115°, Pin=0.025 MPa, Qin=2.8 Lit/s where 90 deg is the cylinder upper plate junction.

The net power saving is equivalent to about twice the expected fuel saving after considering friction resistance and wind averaged performance. One can note a 45-watt power saving at 45 MPH increasing to 180 watts saved at 75 MPH. These power savings translate to more than a 3.5% power saving at speeds between of 45-55 MPH. At higher speeds the aerodynamic power saving (taking into account the invested power in the actuation system) saturates at about 2.8%. Considering that at these speeds (above 60 MPH) two thirds of the power is invested in overcoming aerodynamic drag, the equivalent net fuel savings is about 1.9%. It is recognized by the present inventors that these numbers are significant. The inlet pressure was optimal at about 50 MPH, so larger control authority shifts that peak to higher speeds, depending on the target speed range. Furthermore, the obtainable drag reduction due to the application of the control on the upper aft edge with the simulated road present is smaller compared to its application on the sides of the truck, as will become clear from the subsequent discussion. Two-Dimensional Truck with Two Control Cylinders FIG. 16A is a schematic illustration of the 2D truck model with two control cylinders, and FIG. 16B is a drawing of an image showing a close-up rear-view of the lower aft-corner control cylinder (see "view I" in FIG. 16A).

The actuation locations are: pulsed blowing slot at $\alpha$=130°, suction holes at $\alpha$=115°, Pin=0.04 MPa, where 90 deg is the cylinder summit. Lower cylinder: two rows of suction holes, the 1$^{st}$ at $\alpha$=−121°, the second at $\alpha$=128.5°. Lower cylinder suction magnitude was tuned to provide the same drag reduction as the SaOB array alone at Re~800,000.

The lower control cylinder was also mounted on a rotary system to allow optimal control locations. Only steady-suction was applied at the lower control cylinder. To increase efficiency, SaOB actuation can be employed. The suction was applied from two rows of staggered 2 mm diameter holes, each containing 96 holes and spaced 7.5 deg in their angular locations. The lower suction holes were just exposed for holes location of −90 deg. The same optimization procedure was applied to the lower cylinder, as previously applied to the upper control cylinder, in order to identify a condition which provides the same level of drag reduction that the upper SaOB control cylinder is capable of with inlet pressure of 0.04 MPa. This higher pressure level was selected based on the results shown in FIGS. 14A-14B and 15A-15B and discussed above.

Figure 16C:
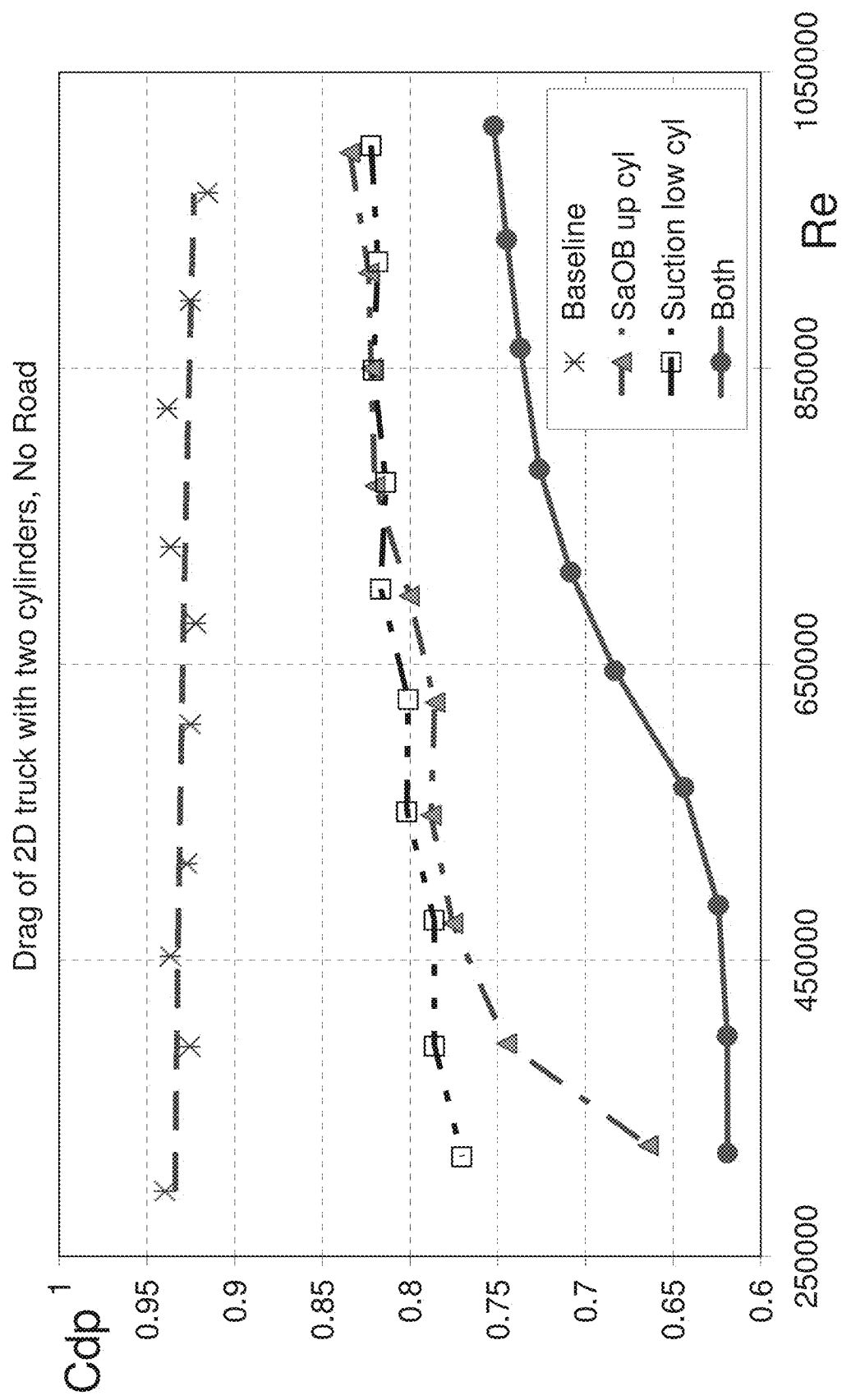
FIG. 16C shows drag reduction as obtained in the experiment performed using the model shown in FIGS. 16A and 16B.

FIG. 16C shows drag reduction due to SaOB array on top aft, Suction cylinder on bottom aft corners. Shown is form-drag coefficient as a function of Reynolds number for four states: baseline, only the upper SaOB cylinder is turn on, only the lower suction cylinder is on, and both control cylinders are on. The data presented shows that the baseline drag of the 2D truck model, with two control cylinders and without the simulated road is 0.93±0.01 regardless of the Reynolds number. The two control cylinders, when operated alone, can provide significant and similar drag reduction over the entire Re range, with the exception of the SaOB control that is more effective at low speeds. This difference might be associated with the oscillation frequency being somewhat low, and therefore optimal at low speeds. It was surprisingly found that when the two control cylinders operated together, the drag reducing effects accumulate. The data presented demonstrates about 20% aerodynamic drag reduction at highway speeds, translated to about 10% net fuel savings on large trucks, busses, and tractor trailer configurations.

It was found by the present inventors that a preferred location for introducing the suction through holes is about 15-20 deg downstream of the plate-cylinder junction. During the cylinder-alone tests, it was found that suction with half the free-stream magnitude is capable of 15 deg separation delay. Therefore, the pulsed blowing was introduced 15 deg further downstream of the suction holes. One control cylinder positioned at the upper aft edge of the simulated trailer is capable of about 10% drag reduction. But if the power invested in the actuation is considered, the optimum is obtained at lower fluidic power input, where the aerodynamic drag reduction is roughly 6-7%. When two control cylinders were applied in a situation simulating a control applied to the two vertical edges of the aft-trailer region, a 20% drag reduction is possible. This should lead to at least 10% net fuel savings on a full scale truck.

It is expected that for a full scale vehicle there will be a significant enhancement in power efficiency. This enhancement will originate from lower resistance of the suction holes (due to larger diameter, smaller wall thickness and rounded edges) and a factor of 2-4 power saving on the actuators' ejector due to the larger ejector nozzle cross section.

REFERENCES

1. Prandtl, L., "Motion of Fluids with Very Little Viscosity", Third International Congress of Mathematicians at Heidelberg, 1904, from Vier Abhandlungen zur Hydrodynamik and Aerodynamik", pp. 1-8, Gottingen, 1927, NACA TM-452, March 1928.
2. Seifert, A., Darabi, A. and Wygnanski, I., 1996, "Delay of Airfoil Stall by Periodic Excitation", J. of Aircraft. Vol. 33, No. 4, pp. 691-699.
3. Collis, S. S., Joslin, R. D, Seifert, A. and Theofilis, V., "Issues in active flow control: theory, simulation and experiment", Prog. Aero Sci., V40, N4-5, May-July 2004 (previously AIAA paper 2002-3277).
4. Annual Progress Report for Heavy Vehicle System Optimization, February 2005, US Dep of Energy.
5. Seifert, A., Paster, S., "Method and mechanism for producing suction and periodic flow", U.S. Pat. No. 7,055,541.
6. Arwatz, G., Fono, I. and Seifert, A., "Suction and Oscillatory Blowing Actuator", paper presented in the MEMS IUTAM meeting, September 2006, London, UK.
7. Pack Melton, L. G., Schaeffler, N., Yao, C. S. and Seifert, A., "Active Control of Flow Separation from the Slat Shoulder of a Supercritical Airfoil", J. of Aircraft, 42 (5): 1142-1149 September-October 2005 (previously AIAA Paper 2002-3156).
8. Pack Melton, L. G., Yao, C. S. and Seifert, A., "Active Control of Flow Separation from the Flap of a Supercritical Airfoil", AIAA J., 44 (1): 34-41 January 2006 (previously AIAA Paper 2003-4005).
9. Seifert, A. and Pack, L. G., "Active Control of Separated Flow on a Wall-mounted "Hump" at High Reynolds Numbers", AIAA J., V. 40, No. 7, July, 2002, pp. 1363-1372. (Part of AIAA paper 99-3430).
10. Englar, R. J., Advanced aerodynamic device to improve the performance, economics, handling and safety of heavy vehicles, SAE paper 2001-01-2072
11. Englar, R. J., Pneumatic Aerodynamic control and drag reduction system for ground vehicles, U.S. Pat. No. 5,908,217, Jun. 1, 1999.
12. Arwatz, G., Fono, I. and Seifert, A. "Suction and oscillatory Blowing Actuator", AIAA J. 2007, to appear.
13. R. C. McCallen, K. Salari, J. Ortega, L. DeChant, B. Hassan, C. Roy, W. D. Pointer, F. Browand, M. Hammache, T. Y. Hsu, A. Leonard, M. Rubel, P. Chatalain, R. Englar, J. Ross, D. Satran, J. T. Heineck, S. Walker, D. Yaste, B. Storms, "DOE's Effort to Reduce Truck Aerodynamic Drag-Joint Experiments and Computations Lead to Smart Design" AIAA paper June 2004.
14. Seifert, A., Stalnov, O., Sperber, D., Arwatz, A., Palei, V., David, S., Dayan, I., and Fono, I., "Large trucks drag reduction using active flow control", paper included in the proceedings of the 2nd heavy vehicle drag reduction conference, 2007. Eds. McCallen, Browand. ISBN 978-3-540-85069-4. Pages 115-134.

Example 2

Efficiency Considerations

The present Example describes considerations directed to the enhancement of the energetic efficiency of unsteady fluidic actuators. In particular, the present Example describes considerations pertaining to the selection of at least one of the oscillation frequency, the spatial distance between the actuators in the array and the 3D distribution of the suction openings. A judicious selection of these parameters, according to some embodiments of the present invention can increase the energetic efficiency, for example, enhanced (e.g., maximal) drag reduction can be obtained at relatively low (e.g., minimal) invested energy.

The above parameters are associated with mechanisms that control and manipulate the boundary layer of the body, its separation process, its noise and vibrations generation mechanism that can also be associated with the vortex shedding regime in the wake of the body.

The oscillation frequency is correlated directly to the frequency of the periodic vortex shedding by the reduced frequency (the oscillations' Strouhal number). Certain oscillation frequencies, which in various exemplary embodiments of the invention are uniform along the actuators in an array of actuators can be applied to trigger the vortex shedding periodic process from its natural uncontrolled state or even to suppress it altogether. This can significantly reduce energy losses when controlling the drag. These oscillation frequencies can be calculated and then applied. Alternatively, an integer multiplication or division of the calculated frequency can be applied.

Judicious selection of the spatial distance between actuators can generate conditions for a specific spanwise wavelength which introduces streamwise vortices into the boundary layer and near wake. This can effect a change in the behavior of boundary layer and near wake in a predetermined manner. The suction pattern, place according to one embodiment upstream of the pulsed blowing location can scale with the distance between actuators to either enhance or attenuate the creation of the streamwise vortices and spanwise waves. It was found by the present inventors that these parameters can significantly affect at least one of the separation delay capability of the AFC system, the drag reduction capability, and the energetic efficiency of the system. In some embodiments of the present invention these parameters are selected to suppress the vortex shedding, vibration and noise generation tendency of the body.

Oscillations Frequency

A bluff body, in a free flow suffers from flow separation which is accompanied by a periodic shedding of vortices from its separated shear-layers. The frequency of the vortex shedding can be expressed by the dimensionless Strouhal number (St) which correlates the vortex shedding frequency f with the free stream velocity v and the body characteristic length L, via the relation St=f L/v.

For most common bluff bodies, the universal value of the Strouhal number is between about 0.15 and 0.25. In some cases, the value of the Strouhal number is between about 0.05 and about 1. In many cases, correlating the frequency with the wake width instead of the characteristic length makes this value fixed at 0.2.

The pulsed or oscillatory blowing feature of the SaOB actuator blows periodically a jet tangentially, perpendicular or at another direction (e.g., upstream) with respect to the surface. Pulsed blowing openings can be in the form of nearly 2D slots to circular holes. The oscillations frequency of this jet can be determined by at least one of the following parameters: the supply pressure to the actuator and the dimensions of the feedback conduit length. To some extent, the presence and features of a synchronization conduit or conduits also affects the frequency. Therefore, by control of these parameters the oscillations frequency can be controlled.

Figure 17:
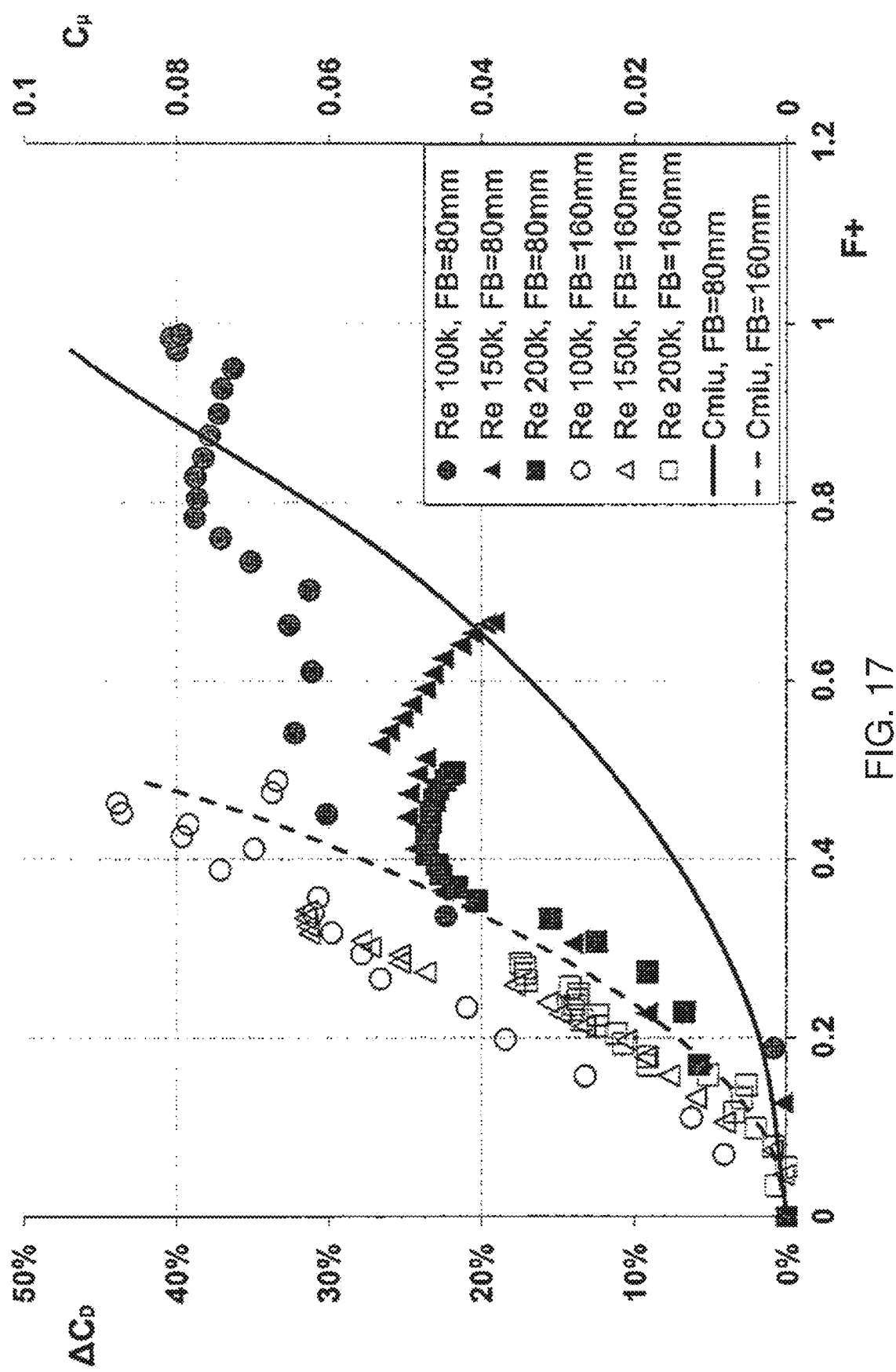
FIG. 17 shows the relative drag reduction dependency on the reduced frequency, as obtained in an experiment performed according to some embodiments of the present invention.

In various exemplary embodiments of the invention the oscillations frequency for bluff body drag reduction is at least 2 or least 3 times larger the natural vortex shedding frequency. This is shown in FIG. 17 which shows the relative drag reduction dependency on the reduced frequency (left side ordinate). The right side ordinate in FIG. 17 shows the momentum coefficient Cμ as a function of the reduced frequency F$^+$, defined as the Strouhal number which is based on the excitation frequency.

The length $L_{FB}$ of the feedback conduit can be expressed in terms of the distance S from the control ports (e.g., from midway between the control ports) to the splitter that separates the two exits from the oscillator (see, e.g., 56 in FIGS. 1A-1F). In some embodiments of the present invention the ratio $L_{AB}$/S is from about 2 to about 10.

In order to achieve a sufficiently high frequency (e.g., twice the natural vortex shedding frequency) for low supply pressures, the feedback conduit length is preferably selected relatively long. For high supply pressures, the feedback conduit length is preferably selected relatively short. Thus, short conduits (e.g., conduits satisfying $2 \leq L_{AB} < 6$) allow high frequencies at low supply pressure, and long conduits (e.g., conduits satisfying $6 \leq L_{AB} \leq 10$) allow low frequencies at high supply pressures.

Spatial Distance Between Adjacent Actuators

Due to the spatial 3D character of the SaOB actuator's blowing feature (according to one embodiment: periodic oscillations of the pulsed jets in the span direction), at certain spatial distances between adjacent actuators (or its spacing along one of the cross flow dimensions of the controlled body), a spanwise structure in the form of spatial sine wave is formed. This wave is associated with the existence of streamwise vortices in the boundary layer and wake flow. These vortices have the ability to manipulate or suppress the natural vortex shedding regime and/or existing wake unsteadiness. Since the natural vortex shedding is an indicator of the wake stability, and it is associated with high values of drag coefficient, its reduction or suppression can effectively reduce the drag.

It was found by the present Inventors that relatively high drag reduction can be achieved for a spatial-spanwise (or cross-flow) directed wave length between about 0.5 and 4, more preferably between 1 and 2, times the characteristic length. The characteristic length can be the same length on which the Strouhal number is based, including, without limitation, the diameter of the cylinder (in embodiments in which the actuator has a shape of a cylinder or a section thereof), the width or height of the AFC system or the like.

In various exemplary embodiments of the invention the spatial distance between actuators is on the order of the characteristic length. It was found by the present Inventors that locating the actuators in this spacing can generate the desired wavelength. In some embodiments of the present invention other values are selected for the spacing, depending on the actuator geometry and the pressure supply to the actuator.

Figure 18:
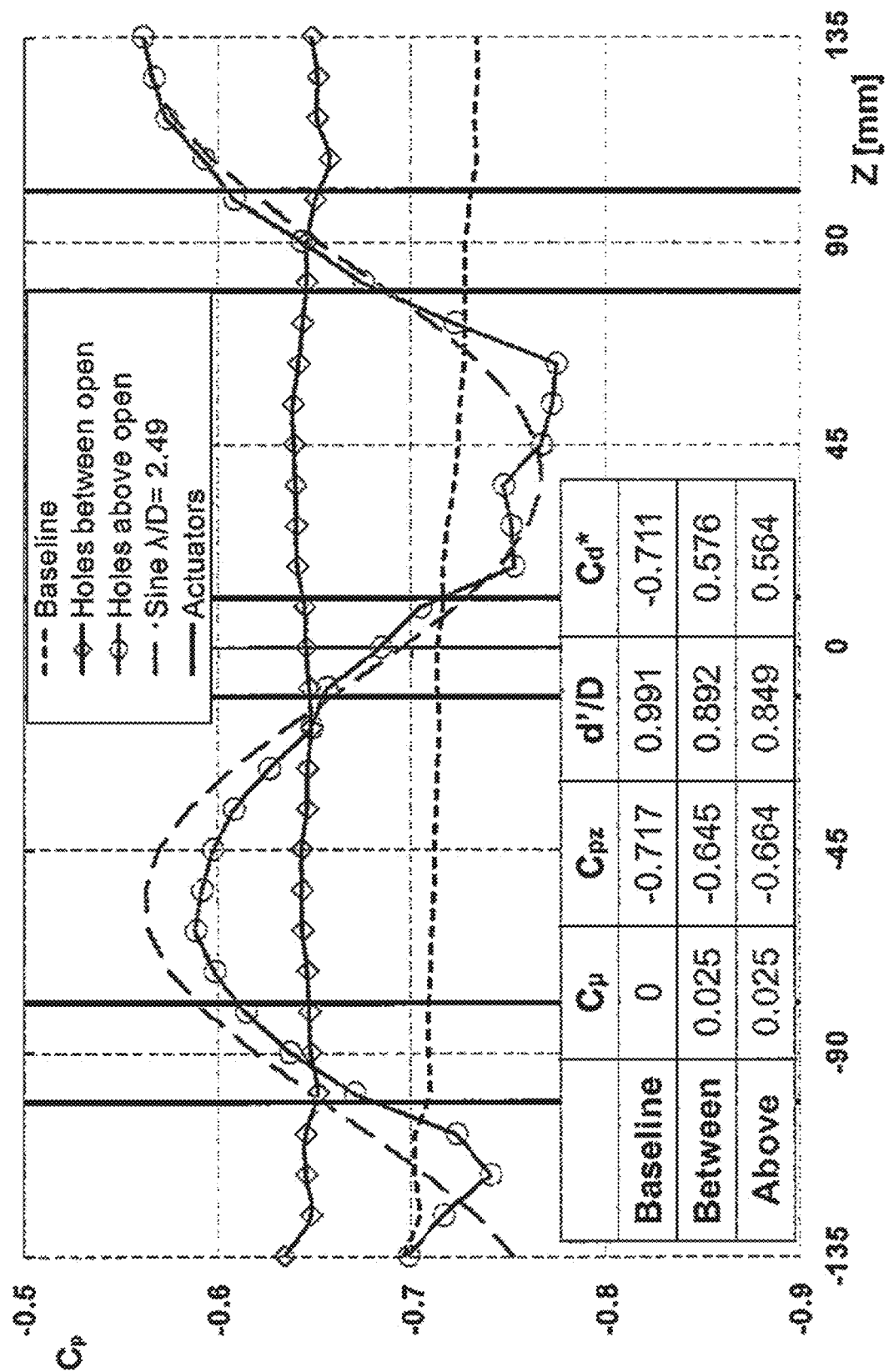
FIG. 18 shows the effect of the spatial waveform on the drag coefficient, according to some embodiments of the present invention.

FIG. 18 shows the effect of the spatial waveform on the drag coefficient. Comparison between identical conditions of momentum coefficient and number of actuator is displayed. The elimination of the spatial wave was achieved by partly sealing of the suction holes, as discussed below. The vertical solid lines mark the position and width of the 3 actuators placed over the 270 mm span of the data shown above.

Partly Sealing the Row(s) of the Suction Holes

An additional tool for control of the spanwise structure of the near wake flow is partly sealing of the suction holes. The segmented pattern of the suction holes has the ability to enhance or suppress the waveform. It was found that the magnitude of the spatial wave (rather than its length) is sensitive to the suction holes pattern. The presence of spatial wave is associated with a significant drag reduction. Therefore, partly sealing the suction openings in conjunction with the location(s) of the pulsed blowing, which triggers strong wave at relatively low energy investment is an essential complementary capability to the spacing between adjacent actuators in the search for maximal energetic efficiency.

Figure 19A:
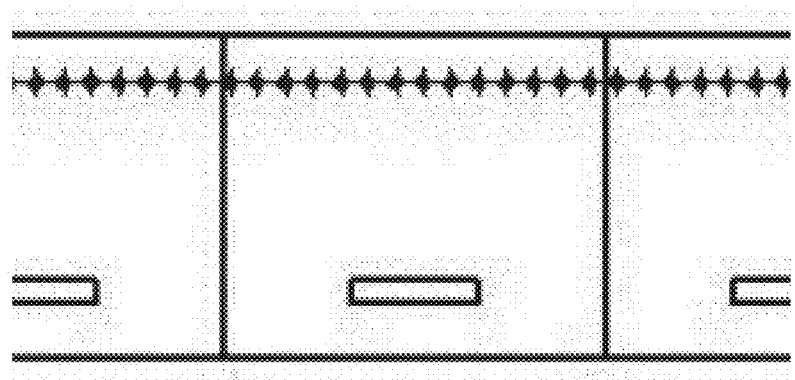
FIGS. 19A-19C illustrate several configurations for the opening of suction holes, according to some embodiments of the present invention.
Figure 19B:
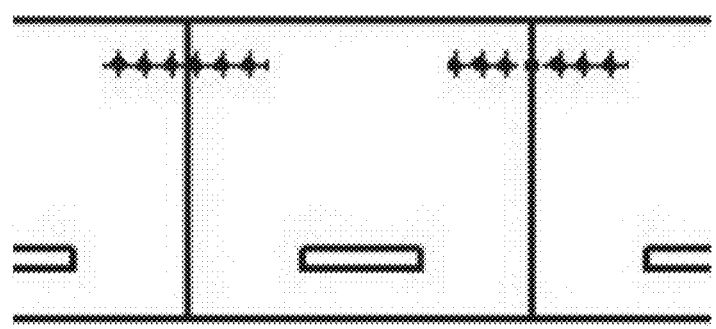
Figure 19C:
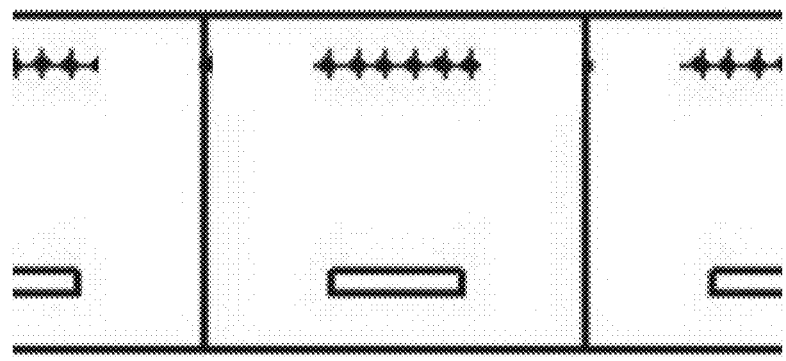

FIGS. 19A-19C illustrate several configurations for the opening of the suction holes. In FIG. 19A, all suction holes open. This configuration is termed herein as the "All" configuration. In FIG. 19B only suction holes between actuators are open. This configuration is termed herein as the "Between" configuration. In FIG. 19C, only suction holes above actuators were open. This configuration is termed herein as the "Above" configuration.

FIG. 18 demonstrates the influence of the suction holes pattern on the ability to generate a spatial wave. In this plot of two cases comparison a distinction is made between open suction holes between or above adjacent actuators where all the other parameters (number of actuators, momentum coefficient and orientation to the free-stream, e.g., flow control location) are identical. The spatial wave is clearly shown and the drag reduction is higher under its influence. When all holes are open the effect is intermediate between the above two cases.

Synchronization of SaOB Actuators Array by a Single Set of Tube

Figure 20A:
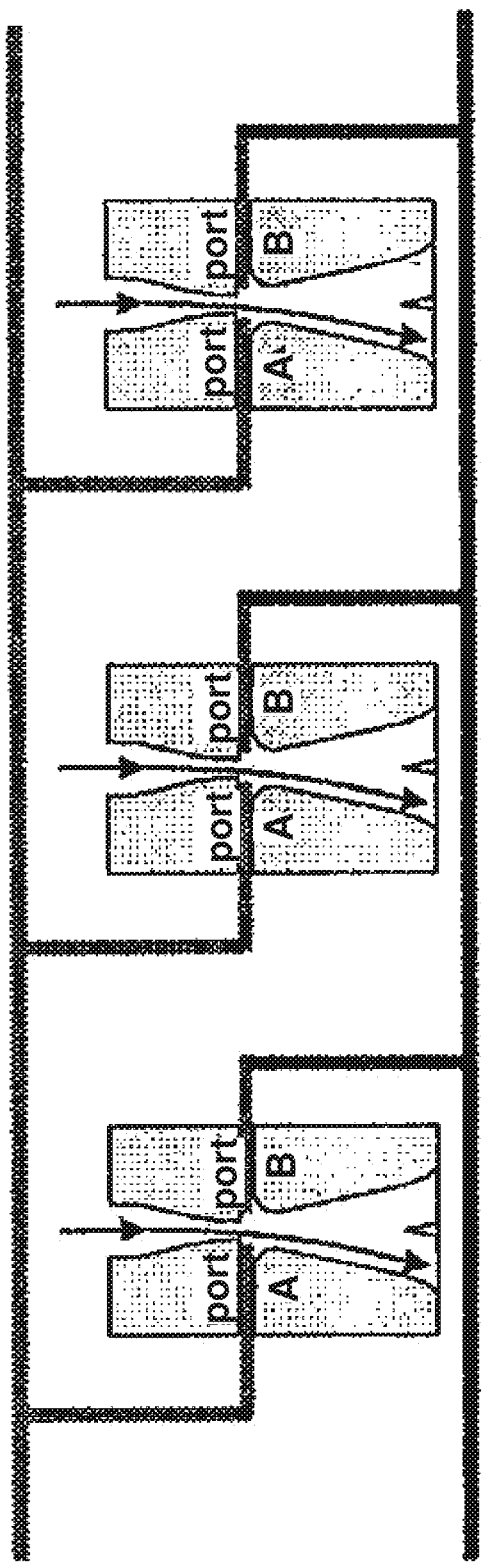
FIG. 20A is a schematic illustration of a configuration in which a synchronization of an array of actuators is performed using a plurality of parallel synchronization conduits connecting each side control ports, according to some embodiments of the present invention.
Figure 20B:
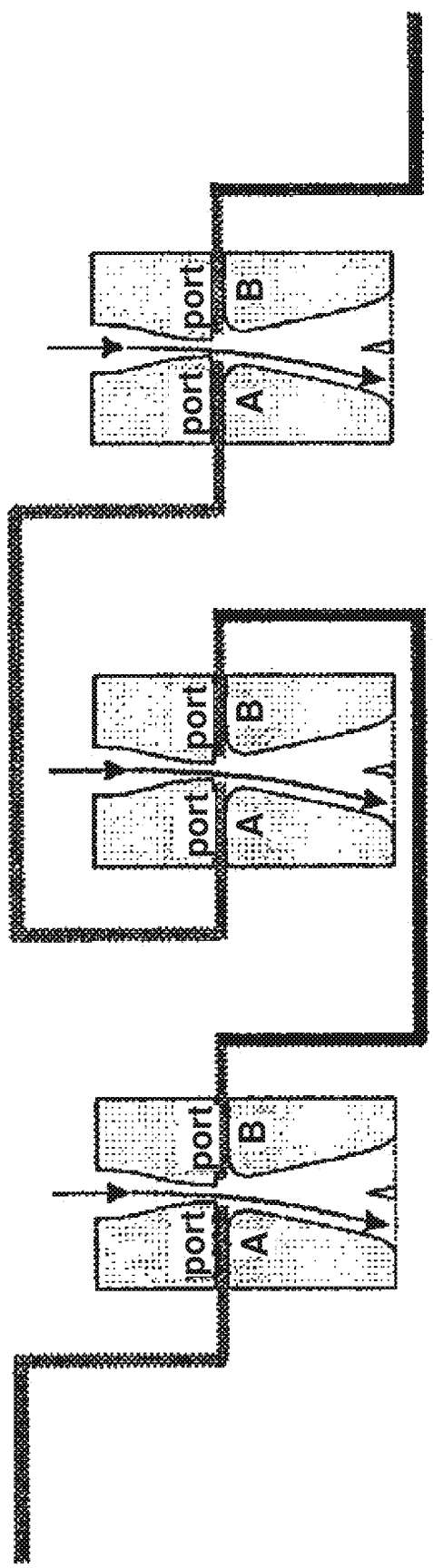
FIG. 20B is a schematic illustration of a configuration in which a single conduit connects ports of the same side (port A to port A and port B to port B), according to some embodiments of the present invention.

Operation of actuators as a part of a synchronized array was proven by the present Inventors to enhance the drag reduction and to deflect the flow better than a not-synchronized array. Synchronization of an array of SaOB actuators can, according to some embodiments of the present invention be using a plurality of parallel synchronization conduits connecting each side control ports. This configuration is shown in FIG. 20A. In an alternative configuration, which is contemplated in some embodiments of the present invention the synchronization is by connecting all the control ports in a serial connection using a single conduit between control ports of adjacent actuators. This configuration is illustrated in FIG. 20B. In FIGS. 20A and 20B, control ports of the same side are designated by the same name.

FIG. 20B illustrates a configuration in which the single conduit connects ports of the same side (port A to port A and port B to port B). However, this need not necessarily be the case, since, for connecting opposite control ports of adjacent actuators (port A to port B).

Tests conducted by the present Inventors with both synchronization methods showed approximately perfect match of the frequency along the actuators in the array and enhancement of the drag reduction with synchronized array. Synchronization by a single conduit (FIG. 20B) is advantageous since the volume used for the synchronization is smaller for single conduit than for a plurality conduit (half, when compared to a configuration with two synchronization conduits). Synchronization by a single conduit (FIG. 20B) is also advantageous since it allows synchronizing the actuators in a phase-lag by connecting opposite control ports to each other (e.g., connecting each B port to the nearest A port).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An active separation control system, comprising:
a fluidic oscillatory actuator having an ejector member,
an oscillator member, and
a joining channel between said oscillator member and said ejector member,
said fluidic oscillatory actuator, said oscillator member and said joining channel being mounted on at least one flexible member,
said fluidic oscillatory actuator being mountable on a rotatable door of a vehicle such that said flexible member assumes a different shape when said door is closed than when said door is open, wherein said joining channel is also flexible to assume a shape of said flexible member.

2. The system of claim 1, comprising at least two flexible members wherein said ejector member is attached at an inner part of one flexible member and said oscillator member is attached at an inner part of another flexible member.

3. The system of claim 1, wherein said fluidic oscillatory actuator has a pair of control ports at opposite sides of said joining channel, and a feedback conduit directly connecting said control ports to each other.

4. The system of claim 3, wherein said feedback conduit is flexible.

5. The system of claim 1, wherein there is a plurality of fluidic oscillatory actuators, wherein the system comprises a synchronization conduit, and wherein said synchronization conduit is mounted on said flexible member to connect at least two of said actuators such as to effect synchronization between oscillations in said at least two actuators.

6. The system of claim 5, wherein said synchronization conduit is flexible.

7. The system of claim 5, wherein said synchronization conduit is effective to provide said synchronization devoid of any moving non-fluidic parts.

8. The system of claim 5, wherein each oscillatory actuator comprises two opposing control ports, and wherein each control port of each oscillatory actuator is respectively connected to at least two control ports of at least two another oscillatory actuators.

9. The system of claim 5, wherein each oscillatory actuator comprises two opposing control ports, and wherein each control port of each oscillatory actuator is connected to only one control port of another oscillatory actuator.

10. The system of claim 5, wherein at least one of said actuator is a suction and oscillatory blowing actuator (SaOB).

11. The system of claim 5, wherein said synchronization conduit is selected to control phase lag among said actuators.

12. The system of claim 5, wherein said at least one synchronization conduit is constituted to effect opposite oscillations among at least one pair of oscillatory actuators.

13. The system of claim 5, wherein a frequency of said oscillatory actuators is X times an expected vortex shedding frequency of fluid at the vicinity of the system, wherein X is from about 1.5 to about 3.5.

14. The system of claim 13, wherein said X equals 2.

15. The system of claim 5, wherein a separation between adjacent fluidic oscillatory actuators is about X v St/f, wherein v is an expected velocity of fluid at the vicinity of the system, f is an expected vortex shedding frequency of fluid at the vicinity of the system, St is an expected Strouhal number characterizing fluidic oscillations, and X is from about 0.5 to about 4.

16. The system of claim 5, wherein said vehicle is a truck trailer.

17. The system of claim 5, wherein said vehicle is an aeronautical system.

18. A vehicle, comprising:
a rotatable door; and
an active separation control system comprising:
a plurality of fluidic oscillatory actuators, each fluidic oscillatory actuator of said plurality of fluidic oscillatory actuators having an ejector member,
an oscillator member, and
a joining channel between said oscillator member and said ejector member,
wherein said oscillator member, said joining channel and at least one of said plurality of fluidic oscillatory actuators are mounted on at least one flexible member;
wherein each fluidic oscillatory actuator is mounted on said rotatable door of the vehicle such that said flexible member assumes a different shape when said door is closed than when said door is open,
wherein said joining channel is also flexible to assume a shape of said flexible member, wherein the active separation control system comprises a synchronization conduit, and wherein said synchronization conduit is mounted on said flexible member to connect at least two of said actuators such as to effect synchronization between oscillations in said at least two actuators.

19. A method of controlling air flow at a surface of a vehicle, the method comprising:
   mounting an active separation control system on a rotatable door of the vehicle, said active separation control system comprising:
   a fluidic oscillatory actuator having an ejector member,
   an oscillator member, and
   a joining channel between said oscillator member and said ejector member,
   said fluidic oscillatory actuator, said oscillator member and said joining channel being mounted on at least one flexible member, such that said flexible member assumes a different shape when said door is closed than when said door is open, wherein said joining channel is also flexible to assume a shape of said flexible member.

* * * * *